United States Patent
Hall et al.

(10) Patent No.: US 12,313,470 B2
(45) Date of Patent: May 27, 2025

(54) METHOD AND APPARATUS FOR OPERATING OPTICAL WAVEMETER AND WAVEMETER COMPRISING SAME

(71) Applicants: HUAWEI TECHNOLOGIES CANADA CO., LTD., Kanata (CA); THE UNIVERSITY OF OTTAWA, Ottawa (CA)

(72) Inventors: Trevor James Hall, Manotick (CA); Mohammad Mehdi Mansouri Rad, Kanata (CA); Gazi Mahamud Hasan, Ottawa (CA)

(73) Assignees: HUAWEI TECHNOLOGIES CANADA CO., LTD., Kanata (CA); THE UNIVERSITY OF OTTAWA, Ottawa (CA)

( * ) Notice: Subject to any disclaimer, the term of this patent is extended or adjusted under 35 U.S.C. 154(b) by 733 days.

(21) Appl. No.: 17/560,901

(22) Filed: Dec. 23, 2021

(65) Prior Publication Data
US 2023/0204430 A1 Jun. 29, 2023

(51) Int. Cl.
*G01J 9/02* (2006.01)
(52) U.S. Cl.
CPC .................. *G01J 9/0246* (2013.01)
(58) Field of Classification Search
CPC .................................................. G01J 9/0246
See application file for complete search history.

(56) References Cited

U.S. PATENT DOCUMENTS

| | | | |
|---|---|---|---|
| 9,929,814 B2 | 3/2018 | Kato et al. | |
| 11,334,107 B2* | 5/2022 | Carolan | G06N 3/08 |
| 2004/0061864 A1* | 4/2004 | Snyder | G01J 9/0246 |
| | | | 356/477 |
| 2011/0147874 A1* | 6/2011 | Nagarajan | H01L 31/02019 |
| | | | 257/E31.127 |

(Continued)

OTHER PUBLICATIONS

Jiaqi Gong, Changyu Shen, Yike Xiao, Shuyi Liu, Chong Zhang, Zeyi Ding, Huitong Deng, Jiahao Fang, Tingting Lang, Chunliu Zhao, Yi Chen, "High sensitivity fiber temperature sensor based PDMS film on Mach-Zehnder interferometer," Optical Fiber Technology, vol. 53, 2019, 102029, ISSN 1068-5200, (Year: 2019).*

(Continued)

*Primary Examiner* — Violeta A Prieto

(57) ABSTRACT

There is provided a method, apparatus and system for calibrating and operating an optical wavemeter. In calibration, training optical signals with known wavelengths are input to a wavemeter, and corresponding photodetector measurements are obtained. Optical parameters of the wavemeter are then estimated based on the measurements. The optical parameters are indicative of a length difference $\Delta L$ between two unequal-length waveguides in an optical delay line of the wavemeter; and scattering parameters of a multi-mode interferometer (MMI) coupler of the wavemeter. The estimation process involves a (e.g. golden-section) search to determine one or more output values for at least one of the optical parameters, based on an objective function which indicates a difference expected and actual measurements. The expected measurements are generated based on a numerical model incorporating candidate values for the optical parameters.

22 Claims, 14 Drawing Sheets

(56) References Cited

U.S. PATENT DOCUMENTS

| | | | |
|---|---|---|---|
| 2011/0235881 A1* | 9/2011 | Lett | G06F 3/04842 |
| | | | 382/128 |
| 2017/0012640 A1* | 1/2017 | Kong | H04B 1/66 |
| 2020/0193580 A1* | 6/2020 | McCall | G06T 7/62 |
| 2020/0193597 A1* | 6/2020 | Fan | H04N 25/135 |
| 2020/0379504 A1* | 12/2020 | Carolan | G06N 3/08 |
| 2021/0399806 A1 | 12/2021 | Bernier et al. | |

OTHER PUBLICATIONS

Chen, Long et al., Silicon-based Integrated Broadband Wavelengthmeter with Low Temperature Sensitivity, Optical Fiber Communication Conference (OFC) 2020, OSA Technical Digest (Optical Society of America, 2020), paper M1C.3, 3 pages.

Han, Ningren et al., Compact and high-precision wavemeters using the Talbot effect and signal processing, Optics Letters, Sep. 1, 2019, 44(17): 4187-4190.

Kleijn, Emil et al., Amplitude and Phase Error Correction Algorithm for 3x3 MMI Based Mach-Zehnder Interferometers, Journal of Lightwave Technology, 33(11): 2233-2239 (2015).

Todd, M.D., et al., A novel Bragg grating sensor interrogation system utilizing a scanning filter, a Mach-Zehnder Interferometer and a 3x3 coupler, Meas. Sci. Technol., 12(7): 771-777 (2001).

Todd, M.D., et al., Improved, operationally-passive interferometric demodulation method using 3x3 coupler, Elect. Lett., 38(15): 784-786 (2002).

Xu, Dan et al., Laser phase and frequency noise measurement by Michelson interferometer composed of a 3x3 optical fiber coupler, Opt. Express, 23(17): 22386-22393 (2015).

* cited by examiner $$x = \begin{bmatrix} \cos(\theta) \\ \sin(\theta) \\ \sqrt{2} \end{bmatrix} \quad p = \begin{bmatrix} p_1 \\ p_2 \\ p_3 \end{bmatrix} \quad A = \begin{bmatrix} 2|s_{11}||s_{12}|\cos(\phi) & 2|s_{11}||s_{12}|\sin(\phi) & \frac{1}{\sqrt{2}}(|s_{11}|^2 + |s_{12}|^2) \\ 2|s_{21}||s_{22}|\cos(\phi) & 2|s_{21}||s_{22}|\sin(\phi) & \frac{1}{\sqrt{2}}(|s_{21}|^2 + |s_{22}|^2) \\ 2|s_{31}||s_{32}|\cos(\phi) & 2|s_{31}||s_{32}|\sin(\phi) & \frac{1}{\sqrt{2}}(|s_{31}|^2 + |s_{32}|^2) \end{bmatrix}$$

Wavemeter Linear Mapping $\quad \mathbf{p} = A\mathbf{x}$

410 — Step 1: Identify $\Delta L$ & $A$ $A = R_{yx} R_{xx}^{-1}$ $R_{yx} = \frac{1}{N} \sum_{k=1,N} y_k x_k^\dagger \quad ; \quad R_{xx} = \frac{1}{N} \sum_{k=1,N} x_k x_k^\dagger$ $\hat{y} = Ax \quad e = \text{sum}|\hat{y} - y|^2$ 420 — Step 2: Identify $x$ $x = A^+ p$ $\theta = \arctan\left(\frac{x_2}{x_1}\right)$

FIG. 4

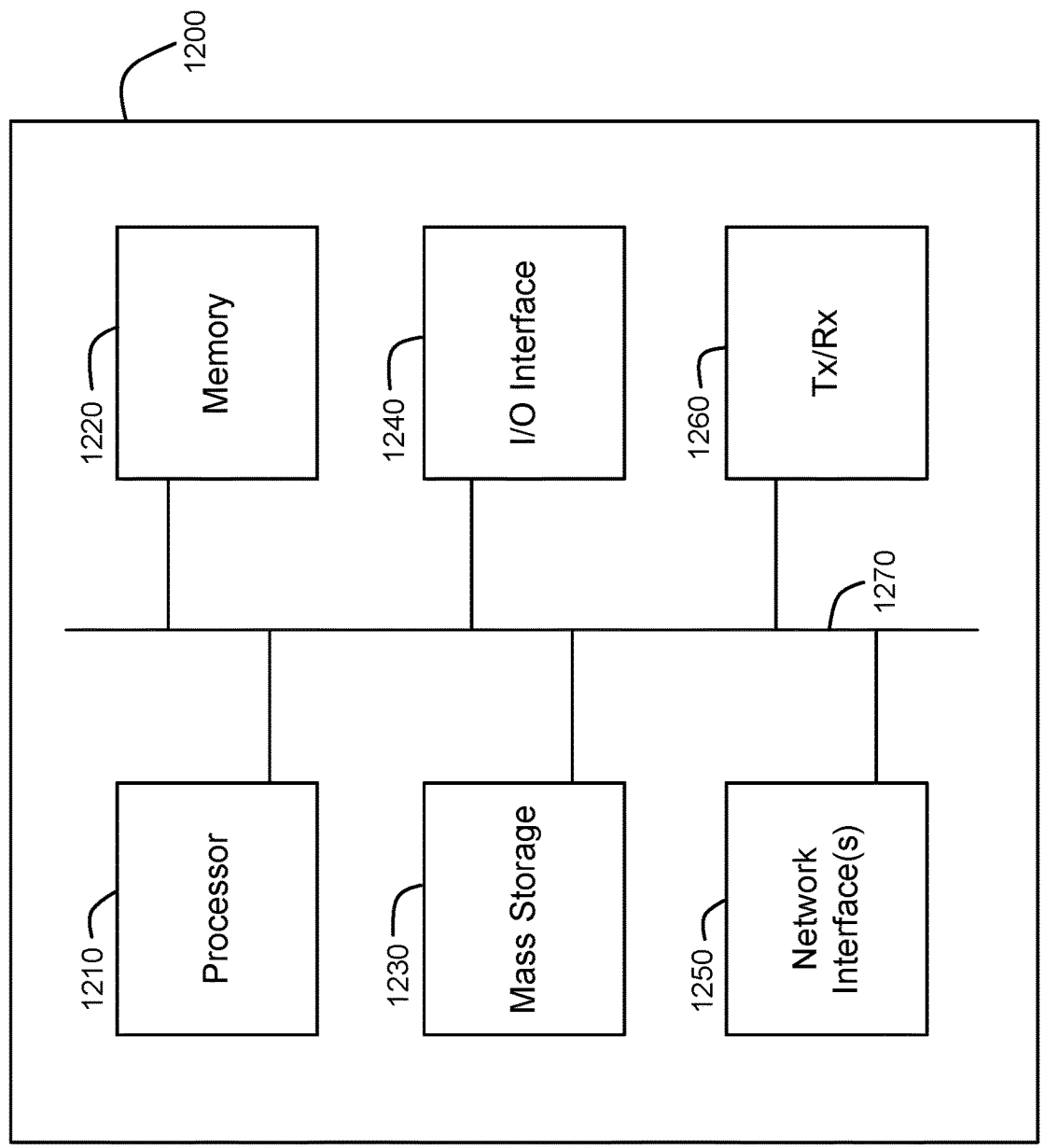

METHOD AND APPARATUS FOR OPERATING OPTICAL WAVEMETER AND WAVEMETER COMPRISING SAME

CROSS-REFERENCE TO RELATED APPLICATIONS

This is the first application filed for the present invention.

FIELD OF THE INVENTION

The present invention pertains to the field of optical measurement devices and in particular to a method and apparatus for calibrating or operating an optical wavemeter, and a wavemeter incorporating such method or apparatus.

BACKGROUND

Frequency measurement of an optical signal, for example as emitted by a laser signal, plays a key role in various applications, such as coherent transponders, Frequency Modulated Continuous Wave (FMCW) LIDAR, photonics sensors etc. Significant research and development effort has been expended to enable measurement or estimation of absolute optical signal frequency. Simple delay line based interferometers for example have been shown to be effective in absolute frequency measurement. While such interferometric systems are relatively simple to design, implementations can suffer from various sources of uncertainty in fabrication and development. Thus it becomes difficult to achieve a target high wavemeter resolution (typically on the order of sub-GHz) over a desired waveband of operation.

Many existing wavemeter approaches rely heavily on ideal component behaviors or estimated component characteristics. These requirements are difficult to meet in practice due to complexity of the involved nonlinear data processing. Existing processing techniques can be complex and difficult to implement due to a nonlinear relationship between parameters. This makes existing solutions somewhat inefficient and impractical.

Existing approaches can also impose various limiting assumptions and requirements on the system. For example, calibration methods can be sensitive to initial conditions, and unknown variables can only be estimated together. Existing approaches can also depend on absolute optical power levels and hence device characterization can be unreliable. Measurements of power levels can be difficult to obtain and are a source of error.

As an example, the approach described in "Amplitude and Phase Error Correction Algorithm for 3×3 MMI Based Mach-Zehnder Interferometers," Journal of Lightwave Technology, Vol. 33, No. 11, Jun. 1, 2015 can suffer from one or more of the above-described drawbacks.

Therefore there is a need for an optical wavemeter, and associated calibration or operation method and apparatus, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for calibrating or operating an optical wavemeter, and a wavemeter incorporating such method or apparatus.

Embodiments of the present disclosure arise from a particular formulation of the wavemeter calibration problem. This formulation allows for the problem to be expressed via a linear system model. Efficient Moore-Penrose signal processing techniques are employed by de-coupling variables and hence characterizing components more independently than in previous attempts.

Embodiments of the present disclosure can provide an efficient and effective means for calibrating a wavemeter based on training optical signals. This allows for reliable and accurate wavemeters which can be integrated into a variety of devices. An apparatus such as a digital signal processor can be configured to perform such calibration. Further transducers can also be provided, such as a photodetector configured to provide an indication of total input power of an optical signal, a temperature sensor configured to provide an indication of temperature of certain components of the wavemeter (e.g. the delay line structure), or both.

In accordance with embodiments of the present disclosure, there is provided a method for implementation in a wavemeter or associated electronics device. The method includes, for example in a calibration mode: for each of a set of training optical signals input to the wavemeter, obtaining a corresponding set of measurements from a plurality of photodetectors. The training optical signals have a priori known and differing wavelengths. The method further includes estimating optical parameters of the wavemeter based on the sets of measurements and an indication of the known and differing wavelengths. The optical parameters are indicative of a length difference $\Delta L$ between two unequal-length waveguides forming an optical delay line structure of the wavemeter. The optical parameters are further indicative of scattering parameters of a multi-mode interferometer (MMI) coupler operatively coupled to outputs of the two unequal-length waveguides. The optical parameters may be indicative of other aspects of the wavemeter, for example an optical coupler or signal splitter which feeds the optical delay line structure, photodetectors, etc. Estimating the optical parameters includes performing a search operation to determine one or more output values for at least one of the optical parameters. These one or more output values cause a predetermined condition in an objective function. The objective function is indicative of a difference between the sets of measurements and an expected value for the sets of measurements. The expected value is generated based on a numerical model which incorporates candidate values for said optical parameters.

In accordance with embodiments of the present disclosure, there is provided an apparatus (e.g. an electronic device) comprising one or more processing components. The processing components can involve electronics or other processing hardware, computer software executed on a computer processor, or the like. The apparatus is configured to obtain, for each of a set of training optical signals input to a wavemeter, a corresponding set of measurements from a plurality of photodetectors. The training optical signals have known and differing wavelengths. The apparatus is configured to estimate optical parameters of the wavemeter based on the sets of measurements and an indication of the known and differing wavelengths. The optical parameters are indicative of a length difference $\Delta L$ between two unequal-length waveguides forming an optical delay line structure of the wavemeter. The optical parameters are also indicative of scattering parameters of a multi-mode interferometer (MMI) coupler operatively coupled to outputs of the two unequal-length waveguides. The estimating of the optical parameters comprises, by the apparatus: performing a search operation to determine one or more output values for at least one of the optical parameters. These one or more output values cause a predetermined condition in an objective function. The objective function is indicative of a difference between the sets of measurements and an expected value for the sets of measurements. The expected value is generated based on a numerical model which incorporates candidate values for said optical parameters.

In accordance with embodiments of the present disclosure, there is provided a wavemeter incorporating an apparatus for example as described above. The wavemeter may include a first MIMI coupler or optical signal splitter configured to separate an input optical signal into at least two portions. The wavemeter may further include an optical delay line structure having two unequal-length waveguides each configured to receive a respective one of said two portions. The wavemeter may further include a second MMI coupler operatively coupled to outputs of the two unequal-length waveguides. The wavemeter may further include a plurality of photodetectors. The wavemeter may further include an apparatus such as an electronics device, which is configured as described above. In particular, the electronic device may have one or more processing components and be configured, in a calibration mode, to obtain measurements and estimate optical parameters of the wavemeter. For each of a set of training optical signals input to the wavemeter, a corresponding set of measurements are obtained from the plurality of photodetectors. The training optical signals have known and differing wavelengths. Estimating optical parameters of the wavemeter is based on the sets of measurements and an indication of the known and differing wavelengths. The optical parameters are indicative of at least: a length difference $\Delta L$ between said two unequal-length waveguides; and scattering parameters of the second MMI coupler. As above, the estimating of the optical parameters includes, by the electronic device, performing a search operation to determine one or more output values for at least one of the optical parameters. These one or more output values cause a predetermined condition in an objective function. The objective function is indicative of a difference between the sets of measurements and an expected value for the sets of measurements. The expected value is generated based on a numerical model which incorporates candidate values for said optical parameters.

In various embodiments, the objective function is an error function, and the predetermined condition is achieving a minimal value. In various embodiments, the search operation implements a golden-section search. In various embodiments, the numerical model is a linear algebraic model.

In various embodiments, the numerical model generates the expected value for the sets of measurements by multiplying a matrix A with a vector x (the vector x for example being on the right-hand side in the multiplication). The matrix A is indicative of estimated values for the scattering parameters. The vector x is indicative of an estimated value for a phase shift between two respective portions of an optical signal propagating in the two unequal-length waveguides. The phase shift is due to said length difference $\Delta L$.

In various embodiments, for example in a metering mode, following the estimating of the optical parameters, the optical parameters are used to determine a wavelength or frequency of a subsequent optical signal input to the wavemeter based on a further corresponding set of measurements from the plurality of photodetectors. In some further embodiments, the numerical model generates the expected value by multiplying the matrix A by the vector x (both as defined above). Further, determining the wavelength or frequency includes: computing an inverse of the matrix A; multiplying said inverse by a vector representing the further set of measurements to obtain a result vector; and further processing of the result vector, for example to extract a phase value $\theta$ from the vector based on a mathematical relationship. The inverse may be a Moore-Penrose inverse.

In some embodiments, each set of measurements includes a measurement indicative of total optical signal power of a corresponding one of the set of training optical signals. In some such embodiments, estimating the optical parameters is further based on these measurements indicative of total optical signal power.

In some embodiments, each set of measurements includes a measurement indicative of total optical signal power of a corresponding one of the set of training optical signals. In addition, the further set of measurements may include a measurement indicative of total optical signal power of the subsequent optical signal.

In some embodiments, first and second sets of temperature readings are also obtained for example using a temperature sensor coupled to a portion of the wavemeter such as the optical delay line. The first temperature readings are indicative of temperature of the optical delay line structure during the actions of estimating of the optical parameters (e.g. in calibration mode). The second temperature readings are indicative of temperature of the optical delay line structure during inputting of the subsequent optical signal to the wavemeter (e.g. in metering mode). The determining the wavelength or frequency of the subsequent optical signal is further based on the first temperature readings and the second temperature readings.

In some embodiments, the optical parameters indicative of the length difference $\Delta L$ include one or more optical parameters indicative of a phase shift $\theta$ between two respective portions of an optical signal propagating in the two unequal-length waveguides.

In some embodiments, each set of measurements includes measurements from at least three (e.g. three, four, or more) photodetectors coupled to at least three respective outputs of the MMI coupler. Thus, the plurality of photodetectors can include at least three photodetectors coupled to at least three respective outputs of the MMI coupler.

In some embodiments, the optical parameters are further indicative of one or more of: scattering parameters of a first multi-mode interferometer (MMI) coupler or optical signal splitter; optical parameters of at least one of the plurality of photodetectors; and electrical parameters of the at least one of the plurality of photodetectors. The first MMI coupler or optical signal splitter is configured to separate an input optical signal into at least two portions and provide these two portions to two respective inputs of the optical delay line structure.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which:

FIG. 4 illustrates aspects of the computation operations for wavemeter calibration and subsequent metering, in accordance with an embodiment of the present disclosure.

FIG. 10 is a schematic diagram of an electronic device, according to embodiments of the present disclosure.

It will be noted that throughout the appended drawings, like features are identified by like reference numerals.

DETAILED DESCRIPTION

The present disclosure provides a method and apparatus for calibrating or operating an optical wavemeter, and a wavemeter incorporating such method or apparatus.

Embodiments of the present disclosure address the problem of characterizing and calibrating a wavemeter device for measurement of wavelength (or equivalently, frequency) of an optical (light) input signal. Notably, embodiments utilize a linear algebra formulation of the problem and hence facilitate a linear system modeling approach for wavemeter device characterization. Using a linear system mathematical framework, advanced and efficient signal processing techniques can be employed, as described herein, to characterize the wavemeter device substantially reliably and fully. This characterization facilitates subsequent reliable wavelength or frequency estimation of an optical light signal.

Embodiments of the present disclosure can potentially enable wavemeters having sub-GHz (e.g. a few MHz) accuracy, and which can be simply integrated into a variety of devices. Examples of devices into which such a wavemeter can be integrated include coherent transponders and LIDAR chips, where the wavemeter can be used for frequency measurement and control applications.

Figure 1:
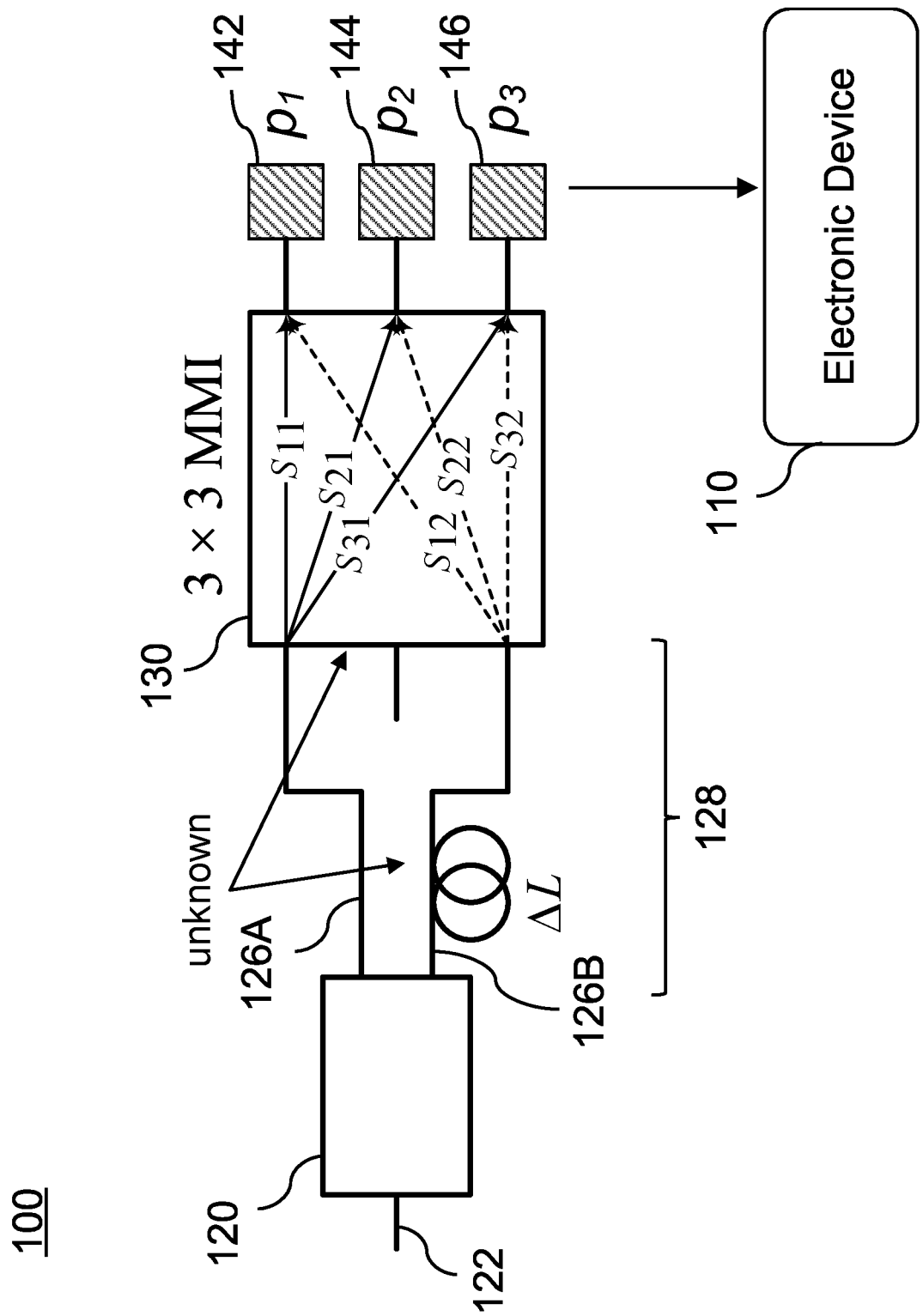
FIG. 1 illustrates a wavemeter and associated electronics device in accordance with embodiments of the present disclosure.

FIG. 1 illustrates a wavemeter 100 along with an electronic device 110 such as a digital signal processor (DSP) which can be configured to characterize the wavemeter in accordance with embodiments of the present disclosure. A first multi-mode interferometer (MMI) coupler 120 or other form of optical signal splitter (e.g. Y-junction in waveguide) has one input 122 and two, three, or more outputs. The first MMI coupler or optical signal splitter is configured to receive an input optical signal at the input and separate it into at least two portions, each of which is provided at one of the outputs. The portions can be equal portions, for example. It is noted that the first MMI coupler or optical signal splitter can separate the input optical signal into three or more portions. For example, referring to FIG. 7, the first MMI coupler can be a 3×3 MMI coupler separating the input optical signal into three portions, one of which is provided to a photodetector PD0 which can be used to measure total input optical signal power.

Two of the outputs of the first MMI coupler or optical signal splitter are coupled to two respective waveguides 126A, 126B of unequal length. These two waveguides form an optical delay line structure 128 of the wavemeter. The outputs of the two waveguides are coupled to different respective inputs of a second MMI coupler 130. The second MMI coupler has at least two input ports and three or more output ports. The second MMI coupler can be a 3×3 or 4×4 MMI coupler, for example. More generally, the second MMI coupler can have two or more input ports and three or more output ports. Some or all of the output ports of the second MMI coupler are coupled to photodetectors (PDs), such as photodiodes. In various embodiments, at least three PDs 142, 144, 146 are coupled to at least three respective output ports of the second MMI coupler. It is noted that ideally (at least in theory) the second MMI coupler can be a 2×2 MMI coupler instead of a 3×3 MMI coupler. However, this tends to create signal fading issues which impedes reliable measurement. For this reason, a 3×3 second MMI coupler 130 is considered as the main example embodiment herein. It is also noted that an MMI coupler, such as a 3×3 MMI coupler, can be a single structure or a structure formed from a plurality of components, such as component 2×2 couplers, phase shifters, etc.

In some embodiments, at least one of the photodetectors is a balanced photodetector, that is, an arrangement comprising two photodetectors (photodiodes) and configured to measure the difference between these two photodetectors. Each balanced photodetector can be coupled to two or more output ports of the second MMI coupler for example in order to differentially measure outputs thereof. For example, in the case of a 6×6 MMI coupler, the six outputs can be organised into three differential pairs, each pair being input to a balanced photodetector. Alternatively, a first input of a balanced photodetector can be coupled to one output port of the second MMI coupler of one wavemeter, and a second input of the same balanced photodetector can be coupled to one output port of the second MMI coupler of another wavemeter. Thus, multiple wavemeters can be used for differential comparison of wavelengths. In some embodiments, at least one of the photodetectors is an unbalanced photodetector.

Outputs of the PDs 142, 144, 146 are provided to an electronic device 110, such as a DSP or other digital or analog circuitry. It is also considered that the electronic device can be replaced with a photonic device or other type of device performing equivalent function, if and when such a device can be manufactured. The electronic device performs signal processing operations such as wavemeter calibration and subsequent measurement operations.

Ideally, the parameters (or characteristics) of various components of the wavemeter, such as the first MMI coupler or signal splitter, the optical delay line structure, the second MMI coupler, and the PDs are known. These parameters include the length difference ΔL between the two unequal-length waveguides of the optical delay line structure, the scattering parameters of one or both of the first and second MMI couplers, the PD transducer characteristics (e.g. detection efficiencies), etc. Parameters are generally indicative of the optical behavior of the wavemeter's components, or associated electrical behavior of transducers. Length difference parameter $\Delta L$ and scattering parameters $s_{11}$, $s_{21}$, $s_{31}$, $s_{12}$, $s_{22}$, $s_{32}$ are shown in FIG. 1. The PD transducer characteristics can include optical parameters of the PDs, electrical parameters of the PDs, or a combination thereof. The PD transducer characteristics can indicate the output voltage, current or power output by a PD in response to an optical input, and the characteristics can be wavelength dependent. Such parameters are referred to herein as optical parameters of the wavemeter. Given this information, the wavemeter can be operated to measure wavelengths of input optical signals. However, due to a variety of factors, these parameters may be unknown, or known only to a limited (often inadequate) precision. Such factors include manufacturing variation, material impurities, temperature fluctuations, etc. Because of this, it is often necessary to perform a calibration operation in order to determine the wavemeter's optical parameters. Once known, the parameters can be used to facilitate the wavemeter's operation.

When the optical delay line structure 128 is fed with two in-phase signals, the phase difference between signals observed at the optical delay line structure outputs is related to the length difference $\Delta L$. This phase shift can be regarded in some cases as an optical parameter, for example replacing the optical parameter $\Delta L$. However, it should be noted that this phase shift can be frequency dependent. As such, optical parameters indicative of the length difference $\Delta L$ can include (or be replaced with) one or more optical parameters which are indicative of a phase shift between two respective portions of an optical signal propagating in the two unequal-length waveguides of the optical delay line structure. Other optical parameters can similarly be provided for.

As will be readily understood by a worker skilled in the art, scattering parameters, or S-parameters, describe the optical behaviour of a device such as an MMI coupler. For example, given a vector a representing powers applied to certain ports of an MMI coupler, and a vector b representing powers read at certain other ports, the scattering parameters can correspond to entries in a matrix S which satisfies the equation b=Sa.

The calibration operation, which can be regarded as a machine learning operation, or alternatively as part of a statistical parameter estimation operation, involves inputting a set of training optical signals into the wavemeter, at the input port 122 of the first MMI coupler. The training optical signals have known and differing wavelengths (or equivalently, frequencies). That is, each training optical signal has a specified wavelength or frequency which is provided as an input to the device (e.g. DSP) performing the calibration. Although the training optical signals have differing wavelengths in a general sense, it is acceptable for some of the training optical signals (e.g. a pair of signals) to have the same wavelength. Thus, fringe measurements made over approximately a free spectral range (FSR) may be made. The training optical signals can be provided one at a time, for example. For each of the training optical signals, the electronics device 110 performing the calibration obtains the resultant measurements (readings) from the PDs 142, 144, 146, which it then associates with the training optical signal (and known wavelength). The PD measurements, along with the indications of training optical signal wavelengths, forms the training data based upon which the optical parameters can be estimated. In other words, for each of the set of training optical signals (having different wavelengths), a corresponding set of measurements from the PDs is obtained.

As will be readily understood by a worker skilled in the art, the number of training samples required may depend on at least the number of unknown parameters to be estimated. For example, a 3×3 A matrix as described herein has 9 unknown parameters, plus $\Delta L$ makes 10 unknown parameters. Because each training sample provides three photodetector readings, a minimum of four training samples may be required in order to produce a number of readings (12) which is greater than the number of unknown parameters. A 3×4 A matrix would have 12 unknown parameters, plus $\Delta L$ makes 13 unknown parameters, which would require five training samples in order to produce a number of readings (15) which is greater than the number of unknown parameters.

Figure 2:
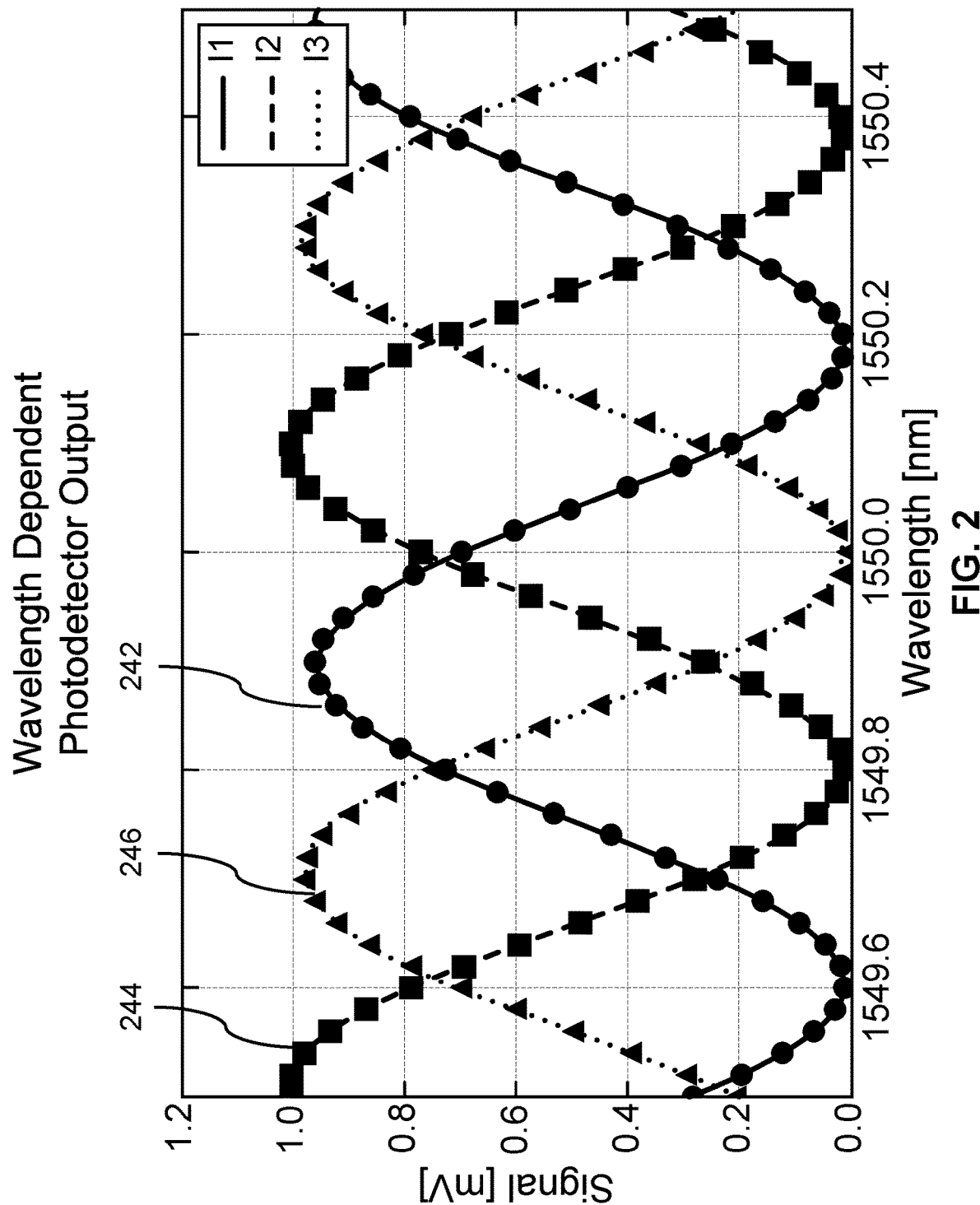
FIG. 2 illustrates photodetector readings obtained from the wavemeter of FIG. 1, for an input optical signal which is swept through a given range of wavelengths, in accordance with embodiments of the present disclosure.

FIG. 2 illustrates an example of PD output signal levels (e.g. expressed in mW) for different wavelengths of training optical signals. In order to perform the calibration, a reference light source (e.g. laser) may be swept across a desired band of wavelengths in order to provide the set of training optical signals. Training optical signals can be transmitted for a plurality of discrete values of wavelengths. Outputs of the PDs can be concurrently captured to provide the training data. As can be seen in FIG. 2, each wavelength of input optical signal corresponds to a set of readings by the PDs. The three reading curves in FIG. 2 correspond to the outputs of the three PDs in FIG. 1. By way of example, curve 242 can correspond to output of PD 142, curve 244 can correspond to output of PD 144, and curve 246 can correspond to output of PD 146. Given the proper modeling of the wavemeter, the readings can be mapped to the wavelength (or frequency) of input light.

As mentioned above, ideally the wavemeter's optical parameters, such as $\Delta L$ or the phase shift due to $\Delta L$, and scattering parameters of the MMI couplers are known. However, due to design deviation, fabrication error, etc., characteristics of each component is impaired or altered, and the optical parameters may not be adequately known. Therefore practically it is required to be able to fully characterize the unknown parameters of the wavemeter for more accurate estimation of the frequency and wavelength of optical signals received after calibration is completed. The measurement points in FIG. 2 may be used as reference points to characterize the device. A calibration operation is thus performed. The calibration operation can include computations employed to estimate the wavemeter's optical parameters, such as the delay line and scattering parameters, as described elsewhere herein. Once the optical parameters have been estimated using training data, the wavemeter can be operated to measure wavelengths (or frequencies) of further input optical signals. This involves mapping the PD readings of the calibrated wavemeter to wavelength or frequency measurements, or else to alternative relevant measurements such as measurements of phase shift in the delay line structure.

The document "Amplitude and Phase Error Correction Algorithm for 3×3 MMI Based Mach-Zehnder Interferometers," Journal of Lightwave Technology, Vol. 33, No. 11, Jun. 1, 2015 specifies a set of relationships between PD readings and phase shift values for a comparable wavemeter implementation. However, it has been recognized by the inventors that this approach has several drawbacks. It requires a nonlinear optimization because the model is formulated in terms of a nonlinear system. A calibration algorithm based on these relationships are power level dependent, which can cause accuracy to be power level dependent also. Further, the calibration algorithm is dependent upon initial conditions and thus it becomes important to have a good initial estimate in order to achieve good accuracy. Embodiments of the present disclosure, in contrast, aim to avoid one or more of these drawbacks. This can lead to a more efficient characterization and modelling, thus supporting faster computation, higher accuracy measurement and estimation in the wavemeter.

To assist in explaining embodiments of the present disclosure, a linear system model for the wavemeter is now presented. For clarity, the presentation uses a 3×3 MMI coupler as the second MMI coupler, with three PDs coupled to the three respective MMI coupler outputs. However, the model can be generalized to larger second MIMI couplers and more corresponding PDs. The power or current $p_m$ output by the $m^{th}$ PD coupled to the output of the second MMI coupler is expressed as follows:

$$p_m = p_0 [2|s_{m2}||s_{m1}|\cos(\varphi_m) \quad 2|s_{m2}||s_{m1}|\sin(\varphi_m) \quad \frac{1}{\sqrt{2}}(|s_{m1}|^2 + |s_{m2}|^2)] \begin{bmatrix} \cos(\theta) \\ \sin(\theta) \\ \sqrt{2} \end{bmatrix}. \quad (1)$$

In the above, $p_0$ represents power of the input optical signal. Parameter $s_{mj}$ represents the $mj^{th}$ S-parameter for the second MIMI coupler, where m indexes the output ports from top right to bottom right in FIG. 1, and j indexes the input ports from top left to bottom left in FIG. 1. Parameter $\varphi_m$ represents the complex phase angle between complex-valued S-parameters $s_{m1}$ and $s_{m2}$. That is, $\varphi_m = \arg(s_{m1}) - \arg(s_{m2})$. Phase value $\theta$ represents a relative phase shift between two respective portions of an optical signal which is split and fed into the two unequal-length waveguides of the delay line structure, the phase shift being observed at the outputs of the two unequal-length waveguides. Thus $\theta$ is intrinsically related to the length difference $\Delta L$. For example, the relationship can be given by:

$$\theta = k\Delta L; k = n_{eff} \frac{2\pi}{\lambda}. \quad (2)$$

In Equation (2), $n_{eff}$ is the effective refractive index of the waveguides (which in general may vary with frequency). It is noted that $\theta$ is a phase shift introduced by the optical delay line structure, and can be considered to be a (frequency-dependent) parameter. In the training data, the value $\lambda$ is known (i.e. vacuum wavelength of training signals). Hence there is a need to search for $\Delta L$ in order to recover $\theta$.

The first (row) vector in Equation (1) can be regarded as a row of a 3×3 MMI scattering matrix. The second (column) vector in Equation (1) can be regarded as a delay line effect, that is, a phase shift vector due to the delay line structure. Three copies of Equation (1), one for each of the three PDs (e.g. as in FIG. 1) can be expressed together in matrix form as:

$$p = Ax; = \begin{bmatrix} p_1 \\ p_2 \\ p_3 \end{bmatrix}; x = \begin{bmatrix} \cos(\theta) \\ \sin(\theta) \\ \sqrt{2} \end{bmatrix}. \quad (3)$$

In Equation (3), the $m^{th}$ row of matrix A is the same as the row vector of Equation (1). Vector p corresponds to the measured photodetector powers (or currents), matrix A is related to the scattering matrix for the second MMI coupler, and vector x depends on (and is representative of) the phase shift due to the delay line structure. This numerical model generates an expected value for a set of photodetector measurements p by multiplying a matrix A by a vector x. The matrix A is indicative of estimated values for scattering parameters, and the vector x is indicative of an estimated value for a phase shift $\theta$ between two respective portions of an optical signal propagating in the two unequal-length waveguides. The phase shift $\theta$ is due to the length difference $\Delta L$ between waveguides. In the general case, matrix A is a 3 by n matrix. Nonlinearity in Equation (3) is avoided by the values $\cos(\varphi_m)$ and $\sin(\varphi_m)$ are absorbed into the entries of A instead of treating $\varphi_m$ as an independent parameter.

It is noted that Equation (1) includes a $p_0$ term expressing input optical signal power. If $p_0$ is constant over all of the training optical signals, then this value can simply be absorbed into the values of the matrix A as expressed in Equation (3). It is also noted that $p_0$ does not have to be the same as the input optical power during metering mode using the same matrix A. This is because the phase retrieval process is invariant to scaling of A. In other words, the input power can fluctuate from sample to sample during normal metering operation (phase retrieval).

If the optical input power fluctuates from training optical signal to training optical signal, then one may need to monitor the input power (detected by PD0 in FIG. 7) and then set:

$$x = p_0 \begin{bmatrix} \cos(\theta) \\ \sin(\theta) \\ \sqrt{2} \end{bmatrix}. \quad (3a)$$

The responsivity of PD0 may be unknown just like PD1, PD2, PD3 as the matrix A may absorb all scalings that are constant during training. The result is invariance to input power fluctuations during training and operation.

The above formulation expresses aspects of the wavemeter parameter estimation problem in terms of a linear system. This allows powerful tools developed for linear systems to be used. In particular, a linear minimum (least) square computation, in conjunction with a Moore-Penrose inverse computation, can be employed for characterizing the wavemeter device modeling in a substantially optimal manner. Accordingly, the linear representation allows the use of powerful linear computation schemes for independently searching for parameter values using available sets of measurements derived from sets of training optical signals.

Based on this linear algebraic formulation, the procedure described below and illustrated in FIG. 3 can be performed to characterize (estimate) the parameters of the wavemeter using a set of obtained training data. The procedure assumes that the training data has been obtained. An overall procedure including the obtaining of training data is described elsewhere herein, for example with respect to FIG. 5.

Figure 3:
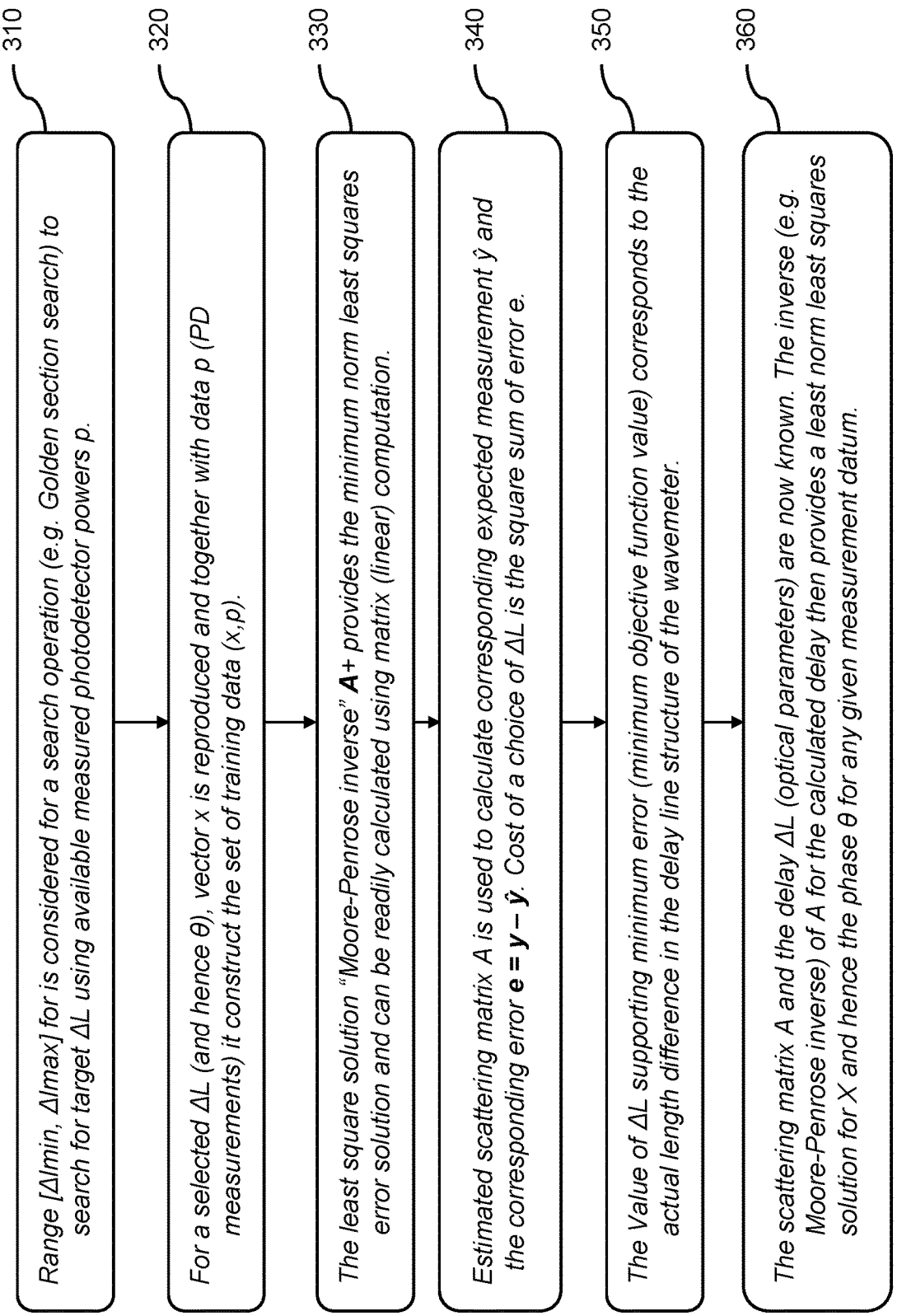
FIG. 3 illustrates computation operations for wavemeter calibration, in accordance with embodiments of the present disclosure.

Turning to FIG. 3, in operation 310 a range [$\Delta l_{min}$, $\Delta l_{max}$] is considered for a search operation to be performed. The range may be a predetermined range which is considered to be the range in which the value of optical parameter $\Delta L$ falls (or is anticipated to likely fall). The range can be based on worst-case manufacturing tolerances, for example. The search operation generally proceeds iteratively by testing candidate values for $\Delta L$ within the predetermined range, and adjusting the candidate values according to results of the test until a suitable "best" value is found. The testing uses the measurements from the photodetectors (measured photodetector powers p). The measurements are obtained as measurements which arise in response to the training optical signals. In practice, when there are multiple training optical signals, there are multiple corresponding sets of photodetector powers p. There are also multiple vectors x each corresponding to one of the training optical signals and also to one of the sets of photodetector powers.

The testing in the search operation may involve evaluating an objective function, in order to find a substantially minimum (or maximum) value thereof. That is, the search operation is performed to determine an output value for $\Delta L$ (or other optical parameters) which causes a predetermined condition in the objective function. The predetermined condition can be that the objective function has reached a substantially minimum (or maximum) value, for example. The output value is the value of the optical parameter(s) which cause(s) the objective function to attain this substantially minimum (or maximum) value.

Finding a substantially minimum (or maximum) value of the objective function can involve finding a locally or globally minimum (or maximum) value, or alternatively finding an adequately small (or large) value, e.g. close to an absolute or relative minimum (or maximum) or at least below (or above) an absolute or relative threshold.

In various embodiments, as will be explained in more detail below, the objective function is indicative of a difference between sets of measurements obtained as a result of the training optical signals, and expected values for these sets of measurements. The expected values are generated based on a numerical (e.g. linear algebraic) model which incorporates candidate values for the optical parameters. For example, the objective function may be an error function which is an increasing function of the difference between the sets of measurements as actually obtained and the expected values for these sets of measurements. Thus, minimizing the error function corresponds to finding the optical parameters which cause the numerical model to generate expected values which most closely match the actual observed measurements values.

Although a variety of types of search operations can be employed, it is considered that a golden-section search, as will be readily understood by a worker skilled in the art, is a suitable type of search operation. The search operation determines an output value for $\Delta L$, or alternatively another parameter that characterizes the dependence of the related quantity $\theta$ on frequency. More generally, the search operation determines one or more output values for at least one of the optical parameters of the wavemeter. In some embodiments, the search (e.g. golden-section search) operates on a single one of the parameters, to determine an output value for this parameter which substantially minimizes (or maximizes) a related objective function. Each iteration of the search operation can involve one instance each of operations 320, 330 and 340. The result of the search operation is interpreted in operation 350, and this result is used in operation 360 to complete the parameter estimation (training) phase (i.e. the operations of the calibration mode).

In operation 320, for a selected value of optical parameter $\Delta L$ (and hence $\theta$), vector x is reproduced. The set of training data (x, p) is constructed from this vector x along with the measured set of photodetector powers p. In some embodiments, the set of training data can include multiple vectors x and multiple photodetector reading vectors p. The multiple vectors x and multiple photodetector reading vectors p can be expressed in matrix form, as a collection of vectors indexed by k. For example, $x_k$ represents the $k^{th}$ training vector x corresponding to the $k^{th}$ training optical signal. Additionally, $y_k$ represents the $k^{th}$ set of photodetector readings. It is noted that p can be used in place of y. These vectors can be used together in the subsequent least squares computations. Reproducing each vector x can involve computing x according to Equation (3), where $\theta$ is determined according to Equation (2). Note that for training, the input optical signals have known wavelengths, hence A is known.

In operation 330, the least square solution "Moore-Penrose inverse" $A^+$ provides the minimum norm least squares error solution and can be readily calculated using matrix computation. In practice, operation 330 can involve the following computations (also illustrated in step 1 of FIG. 4). First, intermediate matrices $R_{yx}$ and $R_{xx}$ are computed via:

$$R_{yx} = \frac{1}{N}\sum_{k=1}^{N} y_k x_k^{\dagger}, \qquad (4)$$

$$R_{xx} = \frac{1}{N}\sum_{k=1}^{N} x_k x_k^{\dagger}, \qquad (5)$$

$$A = R_{yk} R_{xx}^{-1}. \qquad (6)$$

Here, N is the number of training samples, superscript $\dagger$ denotes the conjugate transpose operation (not to be confused with superscript + denoting Moore-Penrose inverse), $x_k$ and $y_k$ are defined as in the preceding paragraph. If (as is typical in practice) the values are real, then the conjugate transpose can be replaced with a transpose operation. The result of these computations is an estimated scattering matrix A which is based on the photodetector readings obtained in response to the training optical signals, and training vectors x which correspond to the current candidate value for optical parameter $\Delta L$.

In operation 340, the estimated scattering matrix A is used to calculate corresponding expected measurement $\hat{y}_k$. An error vector can be defined as $e_k = y_k - \hat{y}_k$. This represents the raw difference between expected and actual measurement outcomes. An error function can be defined as the sum of the squares of the elements in the error vector $e_k$. The objective function, to be minimized, can be set equal to a suitable norm (e.g. L1 norm or L2 norm) or other monotonic scalar-valued function of this error function, or, more particularly, to a sum over all k of the norms of the error vectors $e_k$, the sum being optionally normalized. Thus, the goal of the search operation is to minimize a difference between expected measurements $\hat{y}$ and actual measurements y. In other words, the objective function is indicative of a difference between the set(s) of measurements provided by the photodetectors and the expected value(s) for these set(s) of measurements.

Moreover, the expected value is generated based on a numerical model which includes the estimated scattering matrix A. The numerical model is a linear algebraic model involving linear matrix algebra. Yet further, the estimated scattering matrix A, and hence the numerical model, incorporates (is based on) a candidate value for the optical parameter $\Delta L$, because the $x_k$ values which are used in generation of A are based on the candidate value for $\Delta L$ (or equivalently, based on the corresponding value for $\theta$).

In view of the above, it can be seen that the numerical model generates an expected value for set(s) of measurements by multiplying an estimated scattering matrix A by a vector x. The estimated scattering matrix A is indicative of estimated values for the scattering parameters. The vector x is based on, and thus indicative of, an estimated value for a phase shift θ between two respective portions of an optical signal propagating in two unequal-length waveguides of the wavemeter. The phase shift is due to the length difference ΔL between these two unequal-length waveguides.

In operation 350, the value of ΔL supporting minimum error (i.e. causing a substantially minimum value of the objective function) is taken to correspond to the actual length difference between the two unequal-length waveguides in the optical delay line structure of the fabricated wavemeter device. This is the value of ΔL which is output at conclusion of the search operation. Accordingly, one of the wavemeter's optical parameters is provided directly from the search operation.

The estimated scattering matrix A and the delay ΔL are now fully known. In operation 360, the "Moore-Penrose inverse" of A for the calculated delay then provides a least norm least squares solution for x and hence the phase θ for any given measurement datum. Operation 360 can involve computing an inverse of A (e.g. the Moore-Penrose inverse $A^+$) based on A. From this, x can be determined, and phase value θ can be determined in the manner illustrated in step 2 of FIG. 4 and described below.

Operation 360 is generally used for computing the phase value θ following the optical parameter estimation operations as outlined in Operations 310 to 350. That is, following a calibration mode involving receiving and processing training optical signals, the wavemeter is switched to a metering mode in which it is used to estimate wavelengths or frequencies of subsequent optical signals (the wavelengths of which are unknown a priori). Operation 360 is performed during this metering mode as follows. A further optical signal is applied as input to the wavemeter. Readings (i.e. further corresponding measurements) from the photodetectors are provided, expressed herein as vector p. A vector x is computed via $x=A^+p$, that is by multiplying the inverse of matrix A by a vector p representing the further measurements. Value θ is obtained from x as described below (see step 2 of FIG. 4). From θ, the wavelength or frequency of the subsequent optical signal can be determined via further processing of the result vector x, for example according to Equation (2) or an equivalent. For example, $θ=ωΔτ+θ_0$ can be used, where co is a difference from a reference frequency at which the phase is $θ_0$ (a phase bias). Here, Δτ is a delay parameter for the waveguides in the delay line structure, which is closely related to ΔL. Namely, when the difference between the unequal-length waveguides in the delay line structure is ΔL, the resulting difference in propagation delays (from inputs to outputs) of the unequal-length waveguides is Δτ.

In this manner, following estimating the optical parameters, the optical parameters can be used to determine a wavelength or a frequency of a subsequent optical signal input into the wavemeter. The wavelength or frequency can be determined based on the further corresponding set of measurements p from the plurality of photodetectors.

FIG. 4 schematically illustrates aspects of the above operations, in accordance with an embodiment of the present disclosure. In step 1 410 of FIG. 4, calibration operations are performed in order to determine output values for matrix A (indicative of optical parameters) and delay ΔL (an optical parameter). Equations (4), (5) and (6) are illustrated. This is performed in order to characterize the wavemeter with respect to its important operating parameters. In training, one hasp, and $ω=2πf$ data. Consequently, θ and hence x are known functions of ΔL. The golden-section search is used to determine ΔL and hence the matrix A which minimizes the illustrated sum (i.e. which best fits the training set).

Subsequently, in step 2 420 of FIG. 4, the inverse (e.g. Moore-Penrose inverse) $A^+$ of matrix A is computed and the result is used to determine values for x via the formula $x=A^+p$. From the determined x, phase value θ can be determined according to the formula θ=arctan $$\left(\frac{x_2}{x_1}\right),$$

where $x_1$ and $x_2$ are the first and second components of vector x as just determined. Thus, the Moore-Penrose inverse is used to extract phase information. Frequency information can be determined from the phase information (again via Equation (2) or an equivalent). It is noted that this formula can be readily derived from the definition of x in Equation (3). Step 2 of FIG. 4 corresponds to operation 360 of FIG. 3. FIG. 4 also illustrates formulae for the matrix A, and vectors x and p. Accordingly, in step 2 420, photodetector readings are used to extract a vector x and then the estimated optical signal wavelength (or frequency) is computed.

As will be readily understood, the Moore-Penrose inverse $A^+$ is a widely known generalized form of matrix inverse, which is identical to the traditional matrix inverse (defined such that $A^{-1} A=I$) when the traditional matrix inverse exists. A formula for the Moore-Penrose inverse of matrix A is $A^+=(A^†A)^{-1} A^†$. The Moore-Penrose inverse is also referred to as a pseudoinverse. Other forms of matrix inverse, or their generalizations or approximations, can also be used.

Figure 5:
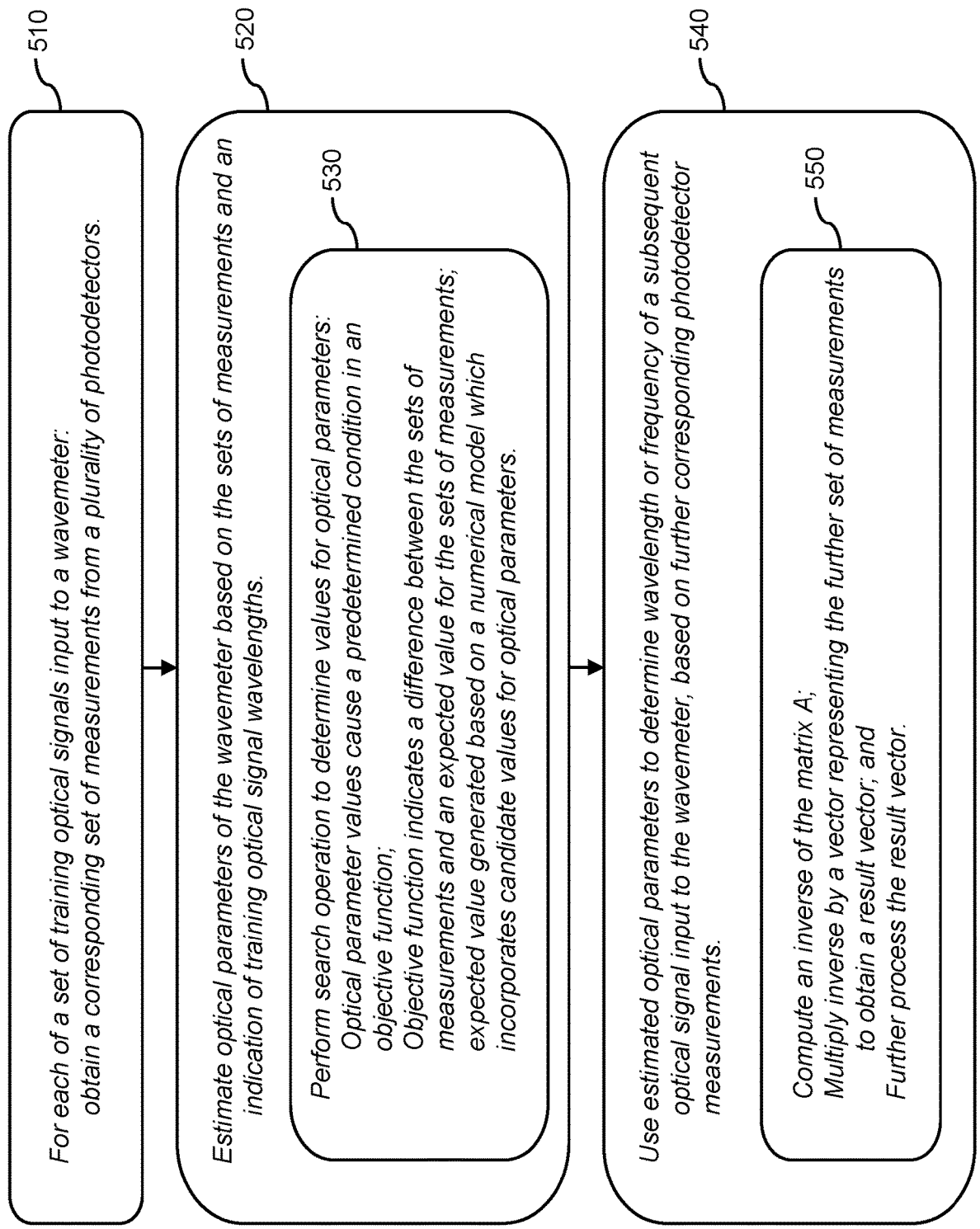
FIG. 5 illustrates further aspects of wavemeter calibration and metering operations in accordance with embodiments of the present disclosure.

FIG. 5 further summarizes operations as described above for calibrating and then operating a wavemeter, according to embodiments of the present disclosure. Operations 510 to 530 correspond to calibration (e.g. in a calibration mode), while operations 540 and 550 correspond to metering (e.g. in a metering mode).

In operation 510, training optical signals are presented (e.g. sequentially) to the wavemeter and photodetector measurements are taken and recorded. In particular, a set of training optical signals having known and differing wavelengths are input to the wavemeter, and for each of these training optical signals, a corresponding set of measurements are obtained from a plurality of photodetectors. In operation 520, calibration is performed, in order to estimate optical parameters of the wavemeter based on the sets of measurements and indications of the training optical signal wavelengths. The estimation is performed as already described in detail above. In particular, as shown in sub-operation 530, a search operation (e.g. a golden-section search) is performed to determine values for the optical parameters. The optical parameter values cause a predetermined condition in an objective function. The objective function can be an error function and can indicate a difference between the obtained sets of photodetector measurements and expected values for the photodetector measurements. The expected values can be generated based on a numerical model which incorporates candidate values for at least one of the optical parameters.

In operation 540, the estimated optical parameters of the waveguide, as determined above, are used to determine wavelength or frequency of a subsequent optical signal input to the wavemeter. The determination is based on further photodetector measurements arising in response to the subsequent optical signal. In particular, as shown in sub-operation 550, the determination involves computing an inverse $A^+$ (e.g. Moore-Penrose inverse) of matrix A, multiplying this inverse by a vector p representing the further set of measurements to obtain a result vector $x=A^+p$, and further processing the result vector for example to obtain value θ.

Figure 6:
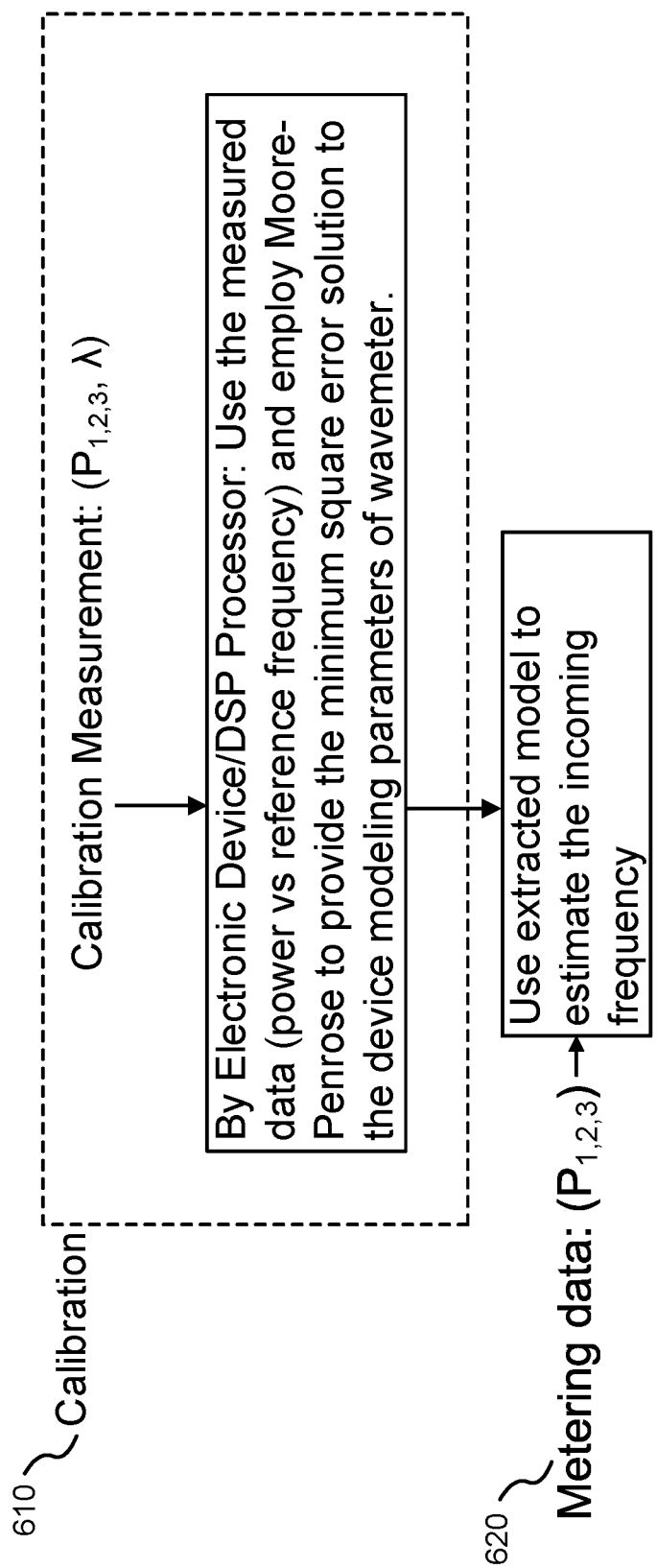
FIG. 6 illustrates further aspects of wavemeter calibration and metering operations in accordance with embodiments of the present disclosure.

FIG. 6 illustrates calibration 610 and metering 620 operations in accordance with another embodiment of the present disclosure. In a calibration operation 610, photodetector measurements are obtained for each of a set of training optical signals having known wavelengths A. Using the photodetector measurements and known wavelengths, an electronic computing device (processing unit) such as a DSP employs processing operations in accordance with a Moore-Penrose inverse to provide a minimum mean squared error solution to the device modeling parameters of the wavemeter. In a metering operation 620, the extracted model is used to estimate the frequency or wavelength of subsequent optical signals, based on associated photodetector measurements.

Various embodiments of the present technology are further configured to measure power of training optical signals, subsequent optical signals, or both, for example using a further photodetector. Various embodiments of the present technology are additionally or alternatively configured to measure temperature at one or more locations in the wavemeter, where the wavemeter's operation or related parameter values is known to vary with temperature.

Figure 7:
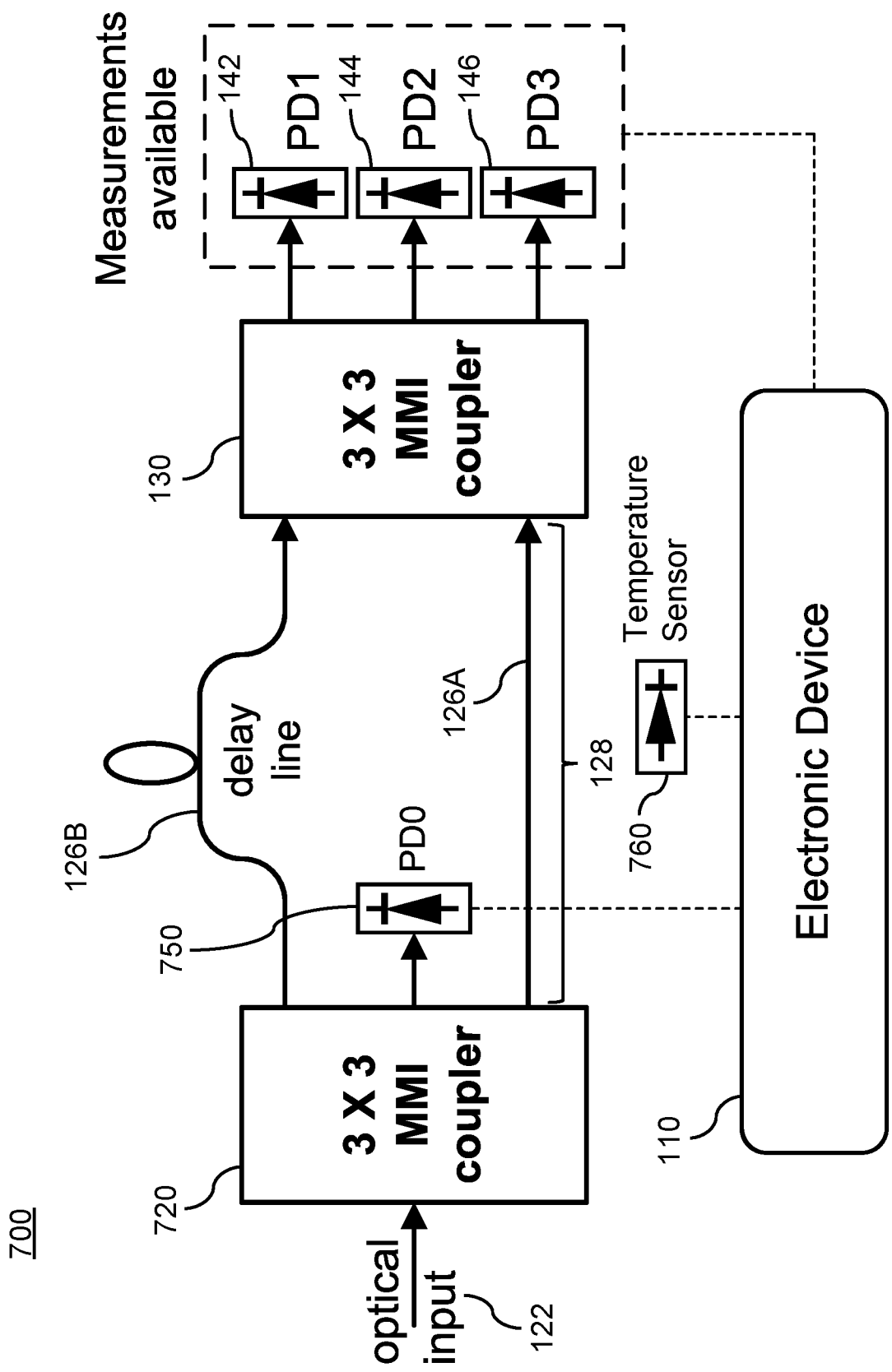
FIG. 7 illustrates a wavemeter and associated electronics device, including a photodetector PD0 for measuring total optical signal power and a temperature sensor for facilitating temperature-based corrections, in accordance with embodiments of the present disclosure.

FIG. 7 illustrates a wavemeter apparatus 700 similar to that of FIG. 1, but with an additional photodetector 750 configured to measure power of input optical signals and a temperature sensor 760 configured to measure temperature at a location in the wavemeter. The measurements of power of input optical signals and measurements of temperature are provided to an electronic device (e.g. DSP) where they may be used in computations affecting wavemeter calibration operations, metering operations, or both.

The apparatus of FIG. 7 includes, by way of illustration, a first 3×3 MMI coupler 720 having a single optical input 122 configured to receive input optical signals, two outputs coupled to the waveguides 126A, 126B of the delay line structure 128, and a third output which is coupled to the input of a photodetector PD0 750 for measuring power of input optical signals. The apparatus further includes the delay line structure 128 which includes a pair of unequal-length waveguides 126A, 126B coupled to the two outputs of the first 3×3 MMI coupler 720 at one end, and at the other end, coupled to two inputs of a second 3×3 MMI coupler 130. The three outputs of the second 3×3 MMI coupler are coupled to three photodetectors 142, 144, 146 as described previously. MMI couplers having other numbers of inputs and outputs can be used. Unused ports of MMI couplers can be suitably terminated, if appropriate. A temperature sensor 760, or a plurality of temperature sensors are provided and configured to measure temperature of the optical delay line structure. It is noted that when temperature of the optical delay line structure changes, the effective dimensions (e.g. length) of the unequal-length waveguides thereof may change due to thermal expansion. Because the lengths are an important physical aspect which affects ΔL, and hence θ, temperature measurements may be used to correct for variations in ΔL which may occur with temperature changes.

Notably, the use of two 3×3 MMI couplers 720, 130 in FIG. 7 allows for a simplified manufacturing process, because the two components are similar. For example, this can result in a hardware scheme configuration which supports a horizontal symmetry plane for the two MMI couplers, which may help mitigate impairments. At the same time, this allows for an extra output port at the first 3×3 MMI coupler which is used for measuring power of input optical signals via photodetector PD0 750. This provides for a reference input which can be used to facilitate device characterization in the calibration mode. For example, if different ones of the training optical signals have different total powers, this can be detected in the measurements provided by the photodetector PD0. A correction can be employed in processing to effectively mitigate or eliminate such power variation. For example, the measurements of the other photodetectors can be corrected to compensate for such power variation, as described earlier, for example with $p_0$ being made explicit in the least squares construction of A. Thus, PD0 can be used to support input power scaling if necessary. If the training optical signals all have the same power level, the photodetector PD0 and associated correction can be omitted.

Thus, in various embodiments, the set of measurements provided in calibration mode include the measurements from the three (or more) photodetectors at the output of the second MMI coupler, along with the measurements indicative of total optical signal power of each of the training optical signals, as provided by the photodetector PD0 750. Estimating of the optical parameters can thus be further based on the measurements indicative of total optical signal power, for example by using such measurements to perform correction or normalization on the measurements from the other photodetectors, as described above. In some embodiments, the further set of measurements, obtained in metering mode, can also include measurements indicative of total optical signal power, as provided by the photodetector PD0. However, such measurements may be unnecessary in various embodiments. For example, in various embodiments, the total optical signal power measurements are only required in training mode and only if the optical signal power fluctuates between training samples.

Temperature measurement and compensation can proceed generally as follows. A first one or more temperature readings indicative of temperature of the optical delay line structure during optical parameters estimation can be obtained. In various embodiments, it can be assumed for simplicity that temperature during the entire parameter estimation operation is substantially constant. However, in other embodiments, temperature variation during the estimation operation (e.g. variations at different times during which different ones of the training optical signals are received), can be taken into account. A second one or more temperature readings indicative of temperature of the optical delay line structure during inputting of a subsequent optical signal to the wavemeter (i.e. during metering) can also be obtained. Furthermore, determining the wavelength or frequency of the subsequent optical signal may be further based on the first one or more temperature readings and the second one or more temperature readings. Accordingly, estimated readings can be adjusted when temperature varies, and the temperature sensor can be used for tracking changes which may influence frequency (or wavelength) estimation.

In some embodiments, a matrix A and a bias $\theta_0$ (e.g. the phase θ corresponding to the reference frequency) may conceivably be determined for each of a plurality of temperatures, and the appropriate matrix and bias used when performing metering at that temperature. However, in other embodiments it is considered that it is only the bias $\theta_0$ that varies significantly with temperature and that the dependency can be described by a linear temperature coefficient. That coefficient can be determined during training with the aid of the temperature sensor. The bias $\theta_0$ can then be adjusted using the reading from the temperature sensor and the known temperature coefficient during metering operation.

It is noted that in some embodiments, where it is only required to measure frequency differences rather than absolute frequencies, the approach may be substantially invariant to temperature. It is absolute frequency measurements that require account of a change of the θ at the reference frequency.

If substantially all environmental conditions of the wavemeter are the same during calibration and metering modes, then the combination of the construction (calibration) of the matrix A and the use of its (Moore Penrose) inverse for phase retrieval (metering) may be substantially invariant to the phase bias $\theta_0$ (the value of θ at the reference frequency). As a consequence, in such conditions the phase bias may be set to zero. A reason for this invariance is that any non-zero phase bias is equivalent to a rotation of the vector x about a cone axis (related to the third component of vector x). If this is not done using a phase bias, then the correct rotation may be incorporated into the matrix A by the training method.

If during calibration, training sets are obtained for different temperatures to construct a collection of matrices A(T) associated to the temperature sensor reading T (as discussed above), then the use of A(T) during operation will provide temperature independent measurements.

In practice, it is the phase bias that dominates the temperature sensitivity because the phase bias depends on the length of the delay line measured on the scale of the optical wavelength. The FSR in comparison is substantially constant. In other words a frequency scan will provide interferometer phase versus frequency data that follows a straight line with an intercept that depends on temperature but with a slope that is substantially temperature independent. Moreover, the intercept (phase bias) may be well-characterized by a linear temperature coefficient.

Consequently, the A matrices corresponding to two different temperatures are anticipated to differ substantially only by a rotation matrix parameterised by an angle that has a linear coefficient of temperature. This observation can be used to facilitate a compact description of the collection of matrices A(T) and further facilitate interpolation between a small number of temperature samples during calibration.

Potential advantages of embodiments of the present disclosure include the following. Relatively simple and reliable matrix computation techniques are leveraged to accurately calculate the unknown parameters of the wavemeter. Embodiments are substantially independent of absolute optical signal power level. Embodiments are independent of initial conditions of the calibration. Embodiments can limit or minimizes error due to measurement (if any) and in the absence of noise, achieve substantially perfect matching, possibly with no error. Embodiments are scalable to 4×4 MMI couplers (for example as be used in coherent transponders). Embodiments provide support for wide range of operation (larger than an FSR). This is supported by experimental data. The temperature compensation approach mitigates or eliminates the need for a temperature-controlled environmental enclosure.

The convergence of nonlinear least squares fitting algorithms require good starting points for all parameters. In contrast, in the case of a known delay, embodiments of the present disclosure involve linear algebra only with no initial estimates. The case of unknown delay requires in addition only an initial broad bracket and a one-dimensional golden section search. This facilitates speed and robustness for such embodiments.

Embodiments presented herein primarily discuss the case where the s-parameters of a second MMI coupler are unknown. However, it should be noted that this can be readily extended to situations where the s-parameters of the first MMI coupler (or optical signal splitter) are unknown and need to be estimated, or where the photodetector parameters are unknown and need to be estimated, etc.

In particular, the A matrix as presented herein can be considered to include the unknown scattering parameters of the first MMI coupler and unknown photodetector responsivities. The A matrix does this by tracing all 6 paths from the input of the first MMI coupler or optical signal splitter to each of the 3 photodetector outputs. The result is the same form as Equation (1), but with the interpretation being different. That is, the parameters of the A matrix can be considered to encode all of the required unknown parameters. The index m corresponds to the output of the photodetector indexed by 'm'. Consequently, $|s_{m1}|$ and $|s_{m2}|$ include $\sqrt{R_m}$ where $R_m$ is the real responsivity of photodetector m. (It is noted that the square root appears squared in all three terms of the row vector).

In this interpretation, the second index (1 and 2 following m) in each S-parameter can be considered to indicate that the path from the ingress port of the first MMI coupler (or optical signal splitter) to the photodetector output m is via the upper arm (1) or the lower arm (2) of the interferometer. Parameter $s_{m1}$ can therefore be considered to include the input coupler complex scattering parameter from its ingress port to its egress port 1. Parameter $s_{m2}$ can similarly be considered to include the input coupler complex scattering parameter from its ingress port to its egress port 2. Accordingly, the estimated optical parameters as considered herein can be considered to be indicative of a variety of characteristics or parameters of the wavemeter.

As described above, reframing of the wavemeter characterization problem to a linear system problem enables good (e.g. on the order of MHz) resolution for frequency estimation across a full C-band or other relevant optical communication band. Full C-band support may be provided for accurate frequency estimation. Power processing techniques and operations can be adjusted for full and accurate device characterization. Embodiments of the present disclosure can mitigate or eliminate challenges and complexities of prior proposals, due to the linear system nature of the approach disclosed herein. In addition, additional normalization steps may not be required, and due to the independence on initial conditions, the optical characterization of the wavemeter parameters can be performed without knowing the appropriate initial point. The hardware described herein, including the use of a temperature sensor and power detecting photodetector PD0, facilitates ready detection and protection and proper adjustment when input power changes and or temperature changes.

As noted previously, wavelength measurement has a wide range of applications in sensing and data transmissions. Coherent systems often highly rely on frequency adjustment of coherent beating signal between the transmitter and receiver. Hence a wavemeter device as described herein can significantly simplify signal processing by providing an on-chip measurement capability for absolute frequency measurement.

Embodiments of the present disclosure can also potentially be applied in other domains. For example, LIDAR applications also highly rely on wavelength/frequency measurement such as in the case of FMCW LIDAR where laser frequency is chirped and the beat signal is used for location and velocity estimation of a reflection. A combination of interferometric hardware and DSP techniques are commonly used for this purpose.

Embodiments of the present disclosure can potentially be used in such LIDAR applications, to further enhance the capability of an on-chip frequency measurement and hence simplify the circuitry for control of FMCW LIDAR systems.

Similarly embodiments of the present disclosure can be applied in relation to a variety of optical sensing and measurement tasks. Embodiments can be employed for enhanced accuracy measurement of laser frequency or wavelength in such tasks.

It is noted that frequency measurement is a key building block in coherent optical systems (local signal vs remote signal). Accordingly, a wavemeter as described herein may be used in conjunction with a switch to select an input and then compare the frequency offset. This approach contrasts with current approaches which are performed fully in the digital domain. This approach can be advantageous in that a dedicated piece of hardware is used to facilitate operation of such coherent optical systems, for the purpose of frequency offset measurement using a single wavemeter device.

For example, an optical switch can be connected to an input port of the wavemeter's first MMI coupler (or optical signal splitter). The optical switch is controllable, for example by a controller or electronic device as mentioned elsewhere herein, to select one of a plurality of reference optical signals. The wavemeter then performs frequency or wavelength measurement on the selected reference optical signal.

The wavemeter can then be integrated into optical equipment and used to measure frequencies or wavelengths of a plurality of different optical signals propagating in the optical equipment by use of the optical switch. The switch can include a single switching component or a plurality of switching components cascaded together to form an overall multi-way switch.

Such a wavemeter device can be integrated into a coherent optical communication device, such as coherent transceiver or coherent transponder. In particular, in such devices, the frequency of a local laser (or other light source) is required to be tuned to match the frequency of an incoming signal (from a remote laser or other light source). Having a wavemeter with an optical switch allows the wavemeter to compare the frequencies of the local light source and the remote light source for frequency matching purposes. The optical switch enables the wavemeter to obtain measurements from each source in turn, rather than requiring this to be done fully in the digital domain.

Figure 8A:
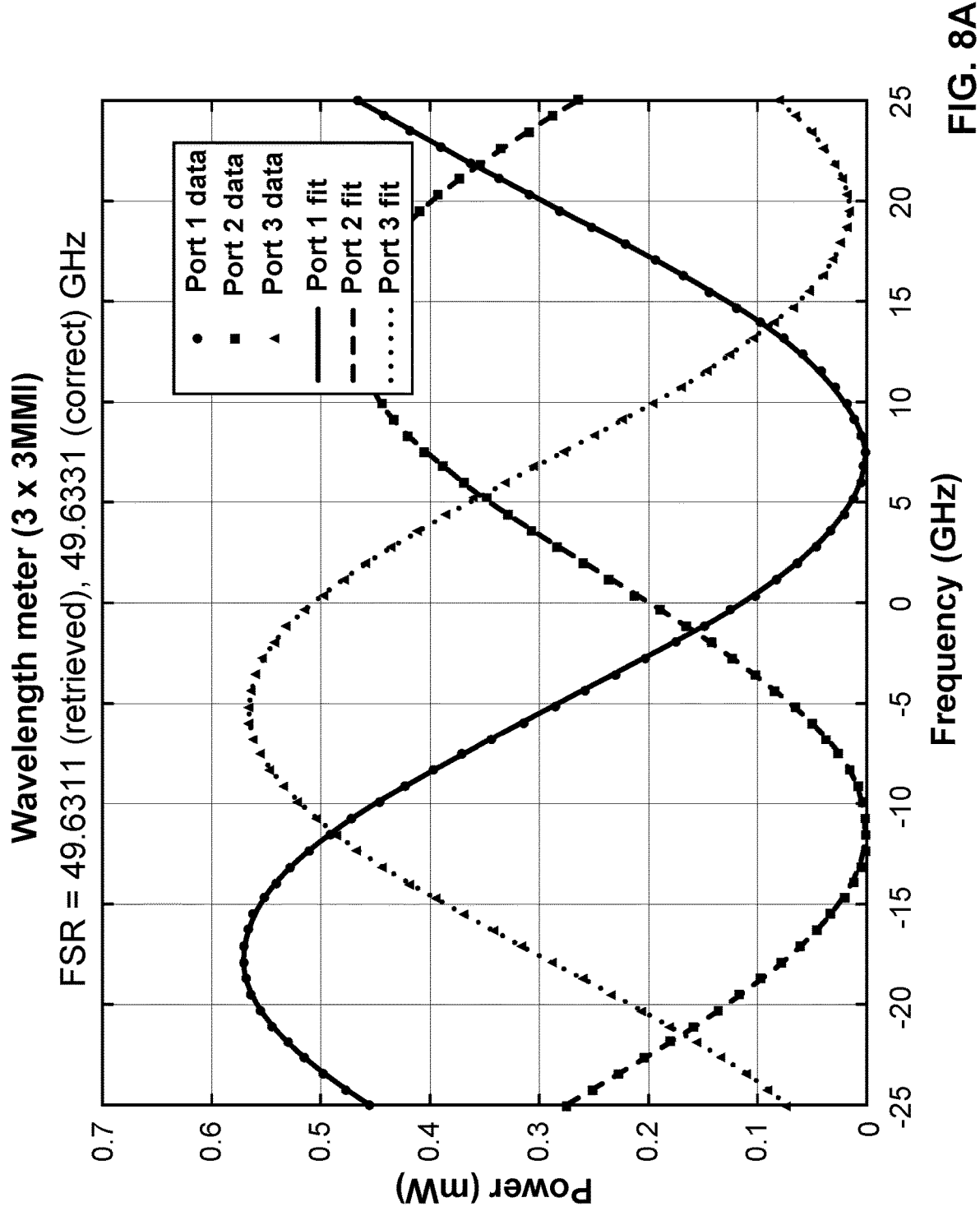
FIGS. 8A to 8C illustrate simulation results in accordance with an embodiment of the present disclosure.
Figure 8B:
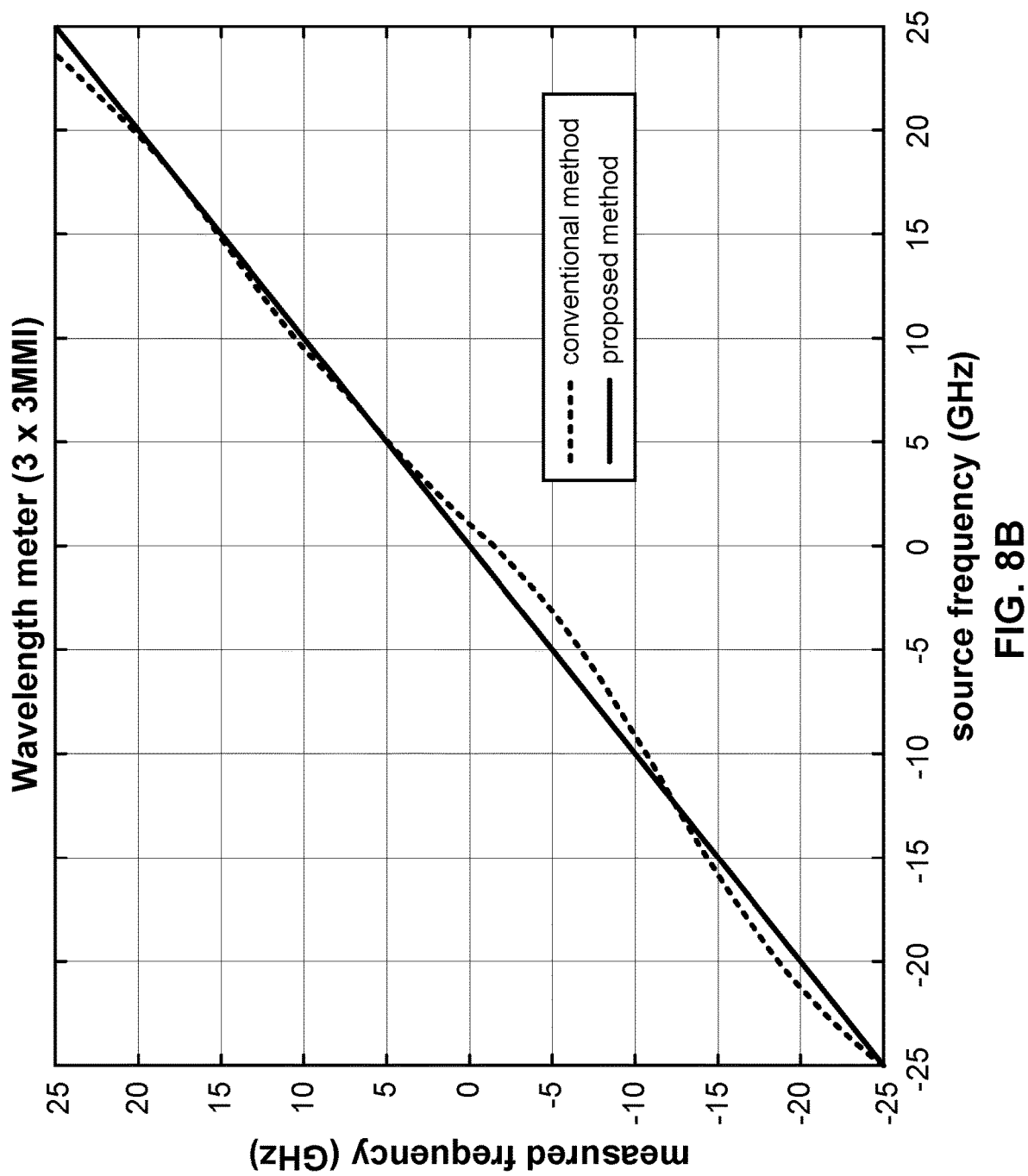
Figure 8C:
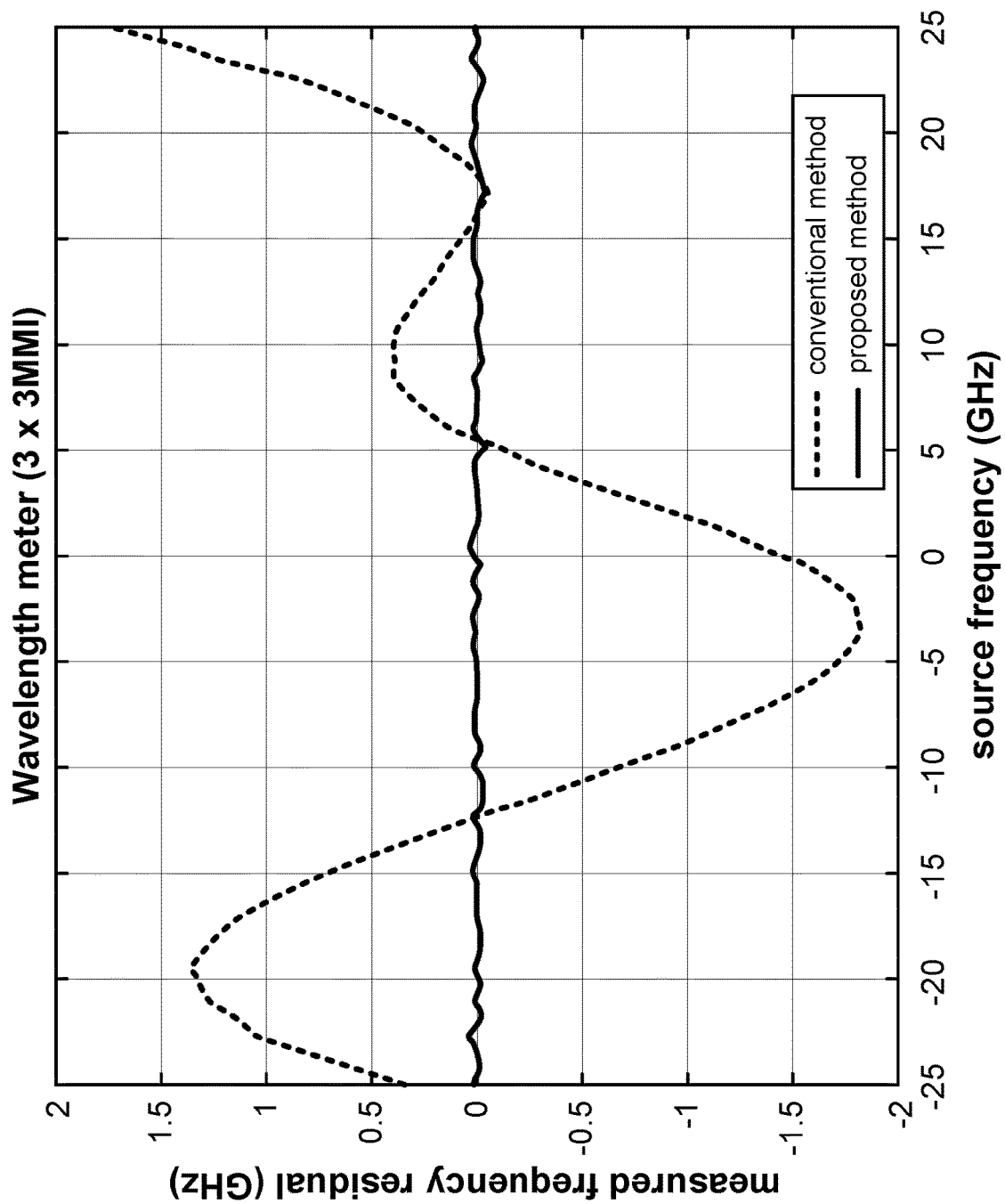

FIGS. 8A to 8C illustrate simulation results in accordance with an embodiment of the present disclosure. A wavemeter having an impaired 3×3 second MMI coupler and an unknown delay line length differential was simulated and simulated measurements were taken. A target of approximately 50 GHz FSR was set. In the simulation, the correct FSR is 49.6331 GHz and the estimated FSR is 49.6311 GHz. The dots in FIG. 8A illustrate the reconstructed expected wavemeter measurements as a function of frequency. FIG. 8B illustrates the correspondence between actual and measured frequency during subsequent simulated operation of the wavemeter. A comparison with a conventional approach is also shown. As illustrated, the simulated measurements more closely follow the actual source frequency than the conventional method. FIG. 8C illustrates the difference more clearly—the residual, i.e. the difference between measured frequency and source frequency, is near zero for the simulation results of the proposed method, but deviate more significantly in the conventional method.

Figure 9A:
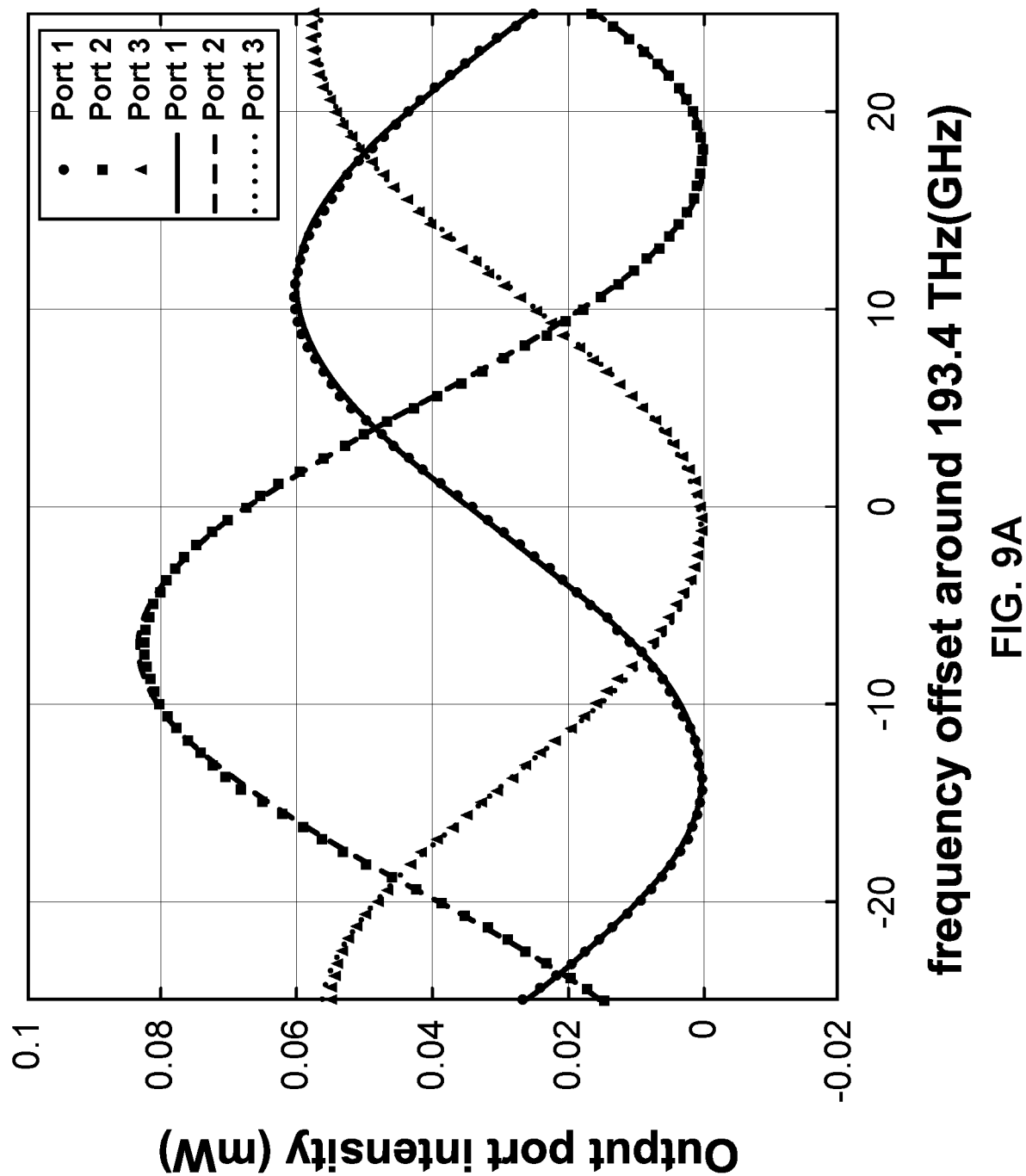
FIGS. 9A to 9C illustrate test results in accordance with an embodiment of the present disclosure.
Figure 9B:
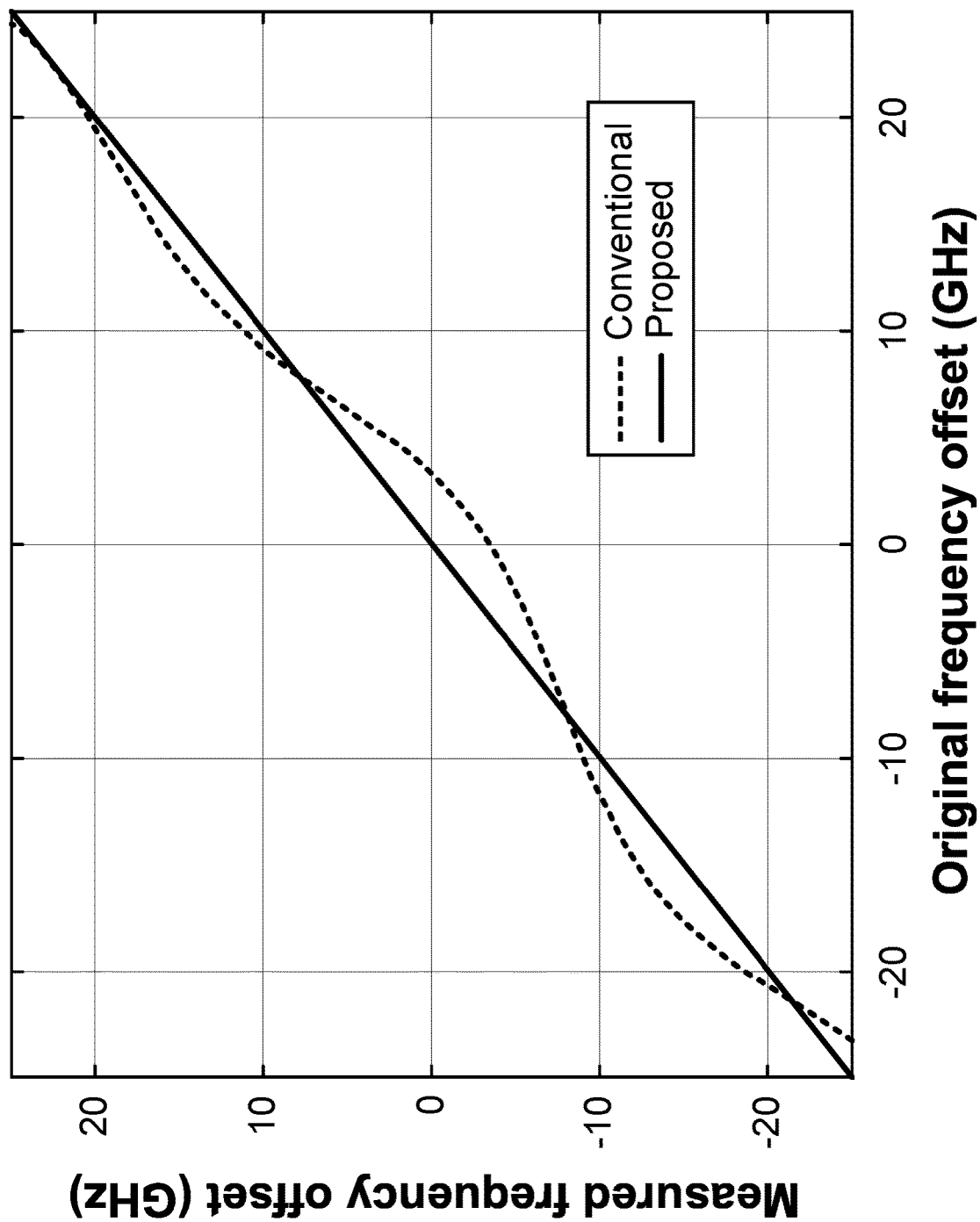
Figure 9C:
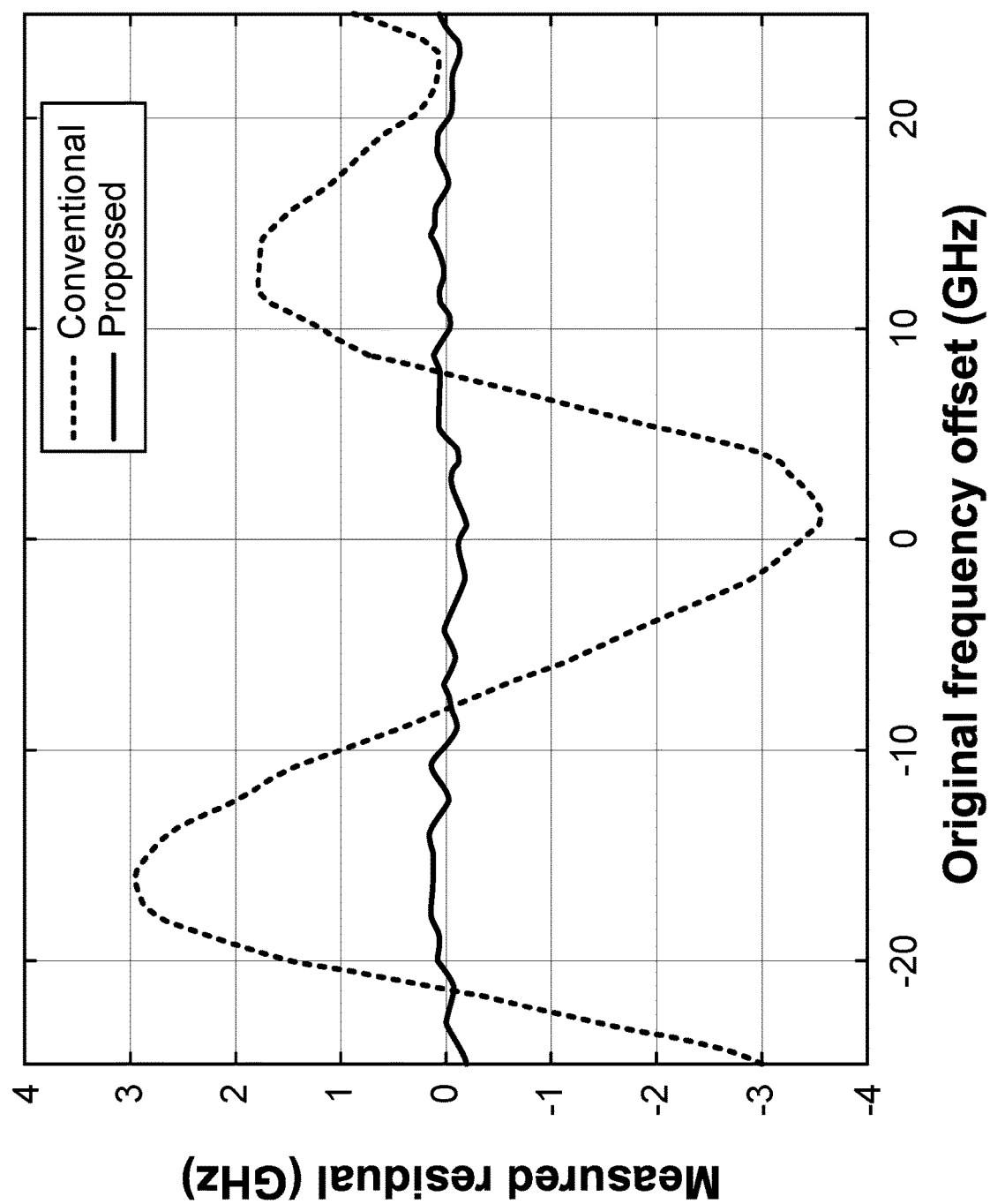

FIGS. 9A to 9C illustrate simulation results in accordance with an embodiment of the present disclosure. A wavemeter optical circuit was fabricated on a $Si_3N_4$ substrate. The C-band MZI architecture included a Y-junction as the input optical signal splitter, and a 3×3 MIMI coupler was used as the output optical coupler. A path length difference in the optical delay line structure was 3393 micrometers. FIG. 9A illustrates the wavemeter measurements as a function of frequency. The wavelength was around 1.55 micrometers with a 3 picometer step size. FIG. 9B illustrates the correspondence between actual and measured frequency during subsequent simulated operation of the wavemeter. A comparison with a conventional approach is also shown. FIG. 9C illustrates the difference more clearly—the residual, i.e. the difference between measured frequency and source frequency, is near zero for the experimentally measured results of the proposed method, but deviate more significantly in the conventional method.

FIG. 10 is a schematic diagram of an electronic device 1000 that may perform any or all of the steps of the above methods and features described herein, according to different embodiments of the present disclosure. For example, end-user computers, smartphones, IoT devices, laptops, tablet personal computers, electronic book readers, gaming machine, media players, devices performing tasks in relation to generation of 2D or 3D images, physical machines or servers, or other computing devices can be configured as the electronic device. An apparatus configured to perform embodiments of the present disclosure can include one or more electronic devices for example as described in FIG. 10, or portions thereof.

As shown, the device includes a processor 1010, such as a Central Processing Unit (CPU) or specialized processors such as a Graphics Processing Unit (GPU) or other such processor unit, memory 1020, non-transitory mass storage 1030, I/O interface 1040, network interface 1050, and a transceiver 1060, all of which are communicatively coupled via bi-directional bus 1070. According to certain embodiments, any or all of the depicted elements may be utilized, or only a subset of the elements. Further, the device 1000 may contain multiple instances of certain elements, such as multiple processors, memories, or transceivers. Also, elements of the hardware device may be directly coupled to other elements without the bi-directional bus.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method steps described above.

An electronic device configured in accordance with the present invention may comprise hardware, software, firmware, or a combination thereof. Examples of hardware are computer processors, signal processors, ASICs, FPGAs, silicon photonic chips, etc. The hardware can be electronic hardware, photonic hardware, or a combination thereof. The electronic device can be considered a computer in the sense that it performs operations that correspond to computations, e.g. receiving and processing signals indicative of image data, implementing a machine learning model such as a neural network model, updating parameters (weights) of the machine learning model, providing outputs of the machine learning model, etc. A machine learning model manager may be responsible for operating the machine learning model, for example by adjusting parameters thereof. The electronic device can thus be provided using a variety of technologies as would be readily understood by a worker skilled in the art. The electronics device can include a computer operatively coupled to memory, such as non-transitory electronic memory. The memory may hold computer program instructions which, when executed, cause the computer to perform operations as described herein.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device. The computer-readable medium may be non-transitory in the sense that the information is not contained in transitory, propagating signals.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method comprising:
for each input optical signal of a set of training optical signals input to a wavemeter, the training optical signals having known and differing wavelengths:
by a first multi-mode interferometer (MMI) coupler or optical signal splitter of the wavemeter, separating the input optical signal into at least two portions;
by each of two unequal-length waveguides of an optical delay line structure of the wavemeter, receiving a respective one of said two portions;
by a second MMI coupler of the wavemeter, receiving outputs of the two unequal-length waveguides;
by a plurality of photodetectors of the wavemeter, monitoring outputs of at least the second MMI coupler;
obtaining a corresponding set of measurements from the plurality of photodetectors; and
estimating optical parameters of the wavemeter based on the sets of measurements and an indication of the known and differing wavelengths,
wherein the optical parameters are indicative of at least:
a length difference $\Delta L$ between the two unequal-length waveguides; and
scattering parameters of the second MMI coupler operatively coupled to outputs of the two unequal-length waveguides,
wherein said estimating the optical parameters comprises:
performing a search operation to determine one or more output values for at least one of the optical parameters, such that said one or more output values causes a predetermined condition in an objective function, the objective function indicative of a difference between the sets of measurements and an expected value for the sets of measurements, the expected value generated based on a numerical model which incorporates candidate values for said optical parameters.

2. The method of claim 1, wherein the objective function is an error function, and the predetermined condition is achieving a minimal value.

3. The method of claim 1, wherein the numerical model generates said expected value by multiplying a matrix A by a vector x, the matrix A indicative of estimated values for the scattering parameters, the vector x indicative of an estimated value for a phase shift between the two portions of the input optical signal propagating in the two unequal-length waveguides, the phase shift being due to said length difference $\Delta L$.

4. The method of claim 3, wherein the matrix A is a 3×3 matrix such that, for m ranging from 1 to 3 inclusive, row m of the matrix A is given by:

$$p_0[2|s_{m2}||s_{m1}|\cos(\varphi_m) \; 2|s_{m2}||s_{m1}|\sin(\varphi_m) \; 1/\sqrt{2}(|s_{m1}|^2+|s_{m2}|^2)]; \text{ and}$$

the vector x is given by:

$$\begin{bmatrix} \cos(\theta) \\ \sin(\theta) \\ \sqrt{2} \end{bmatrix},$$

or alternatively wherein row m of the matrix A is given by:

$$2|s_{m2}||s_{m1}|\cos(\varphi_m) 2|s_{m2}||s_{m1}|\sin(\varphi_m)1/\sqrt{2}(|s_{m1}|^2+|s_{m2}|^2); \text{ and}$$

the vector x is given by:

$$p_0 \begin{bmatrix} \cos(\theta) \\ \sin(\theta) \\ \sqrt{2} \end{bmatrix},$$

where $p_0$ is power of the input optical signal, $s_{m1}$ and $s_{m2}$ are respective ones of the estimated values for the scattering parameters, om represents a complex phase angle between $s_{m1}$ and $s_{m2}$, and $\theta$ is the estimated value for the phase shift between the two portions of the input optical signal.

5. The method of claim 1, further comprising, following said estimating the optical parameters, using the optical parameters to determine a wavelength or frequency of a subsequent optical signal input to the wavemeter, based on a further corresponding set of measurements from the plurality of photodetectors.

6. The method of claim 5, wherein:
the numerical model generates said expected value by multiplying a matrix A by a vector x, the matrix A indicative of estimated values for the scattering parameters, the vector x indicative of an estimated value for a phase shift between the two portions of the input optical signal propagating in the two unequal-length waveguides, the phase shift being due to said length difference ΔL; and
wherein determining the wavelength or frequency comprises:
computing an inverse of the matrix A;
multiplying said inverse by a vector representing the further set of measurements to obtain a result vector; and
further processing of the result vector.

7. The method of claim 6, wherein the inverse is a Moore-Penrose inverse.

8. The method of claim 5, further comprising:
obtaining a first one or more temperature readings indicative of temperature of the optical delay line structure during said estimating of the optical parameters; and
obtaining a second one or more temperature readings indicative of temperature of the optical delay line structure during inputting of said subsequent optical signal to the wavemeter,
wherein said determining the wavelength or frequency of the subsequent optical signal is further based on the first one or more temperature readings and the second one or more temperature readings.

9. The method of claim 1, wherein each set of measurements includes a measurement indicative of total optical signal power of a corresponding one of the set of training optical signals, and wherein said estimating the optical parameters is further based on the measurements indicative of total optical signal power.

10. The method of claim 1, wherein each set of measurements includes measurements from at least three photodetectors, of the plurality of photodetectors, coupled to at least three respective outputs of the second MMI coupler.

11. The method of claim 1, wherein:
(a) the optical parameters indicative of the length difference ΔL comprise one or more optical parameters indicative of a phase shift between the two portions of the input optical signal propagating in the two unequal-length waveguides; or
(b) the optical parameters are further indicative of one or more of:
scattering parameters of the first MMI coupler or optical signal splitter;
optical parameters of at least one of the plurality of photodetectors; and
electrical parameters of said at least one of the plurality of photodetectors; or
both (a) and (b).

12. A wavemeter comprising:
a first multi-mode interferometer (MMI) coupler or optical signal splitter configured to separate an input optical signal into at least two portions;
an optical delay line structure operatively coupled to outputs of the first MMI coupler and comprising two unequal-length waveguides each configured to receive a respective one of said two portions;
a second MMI coupler operatively coupled to outputs of the two unequal-length waveguides;
a plurality of photodetectors operatively coupled to at least outputs of the second MMI coupler; and
an electronic device operatively coupled to the plurality of photodetectors and comprising one or more processing components configured, in a calibration mode, to:
obtain, for each training signal of a set of training optical signals input to the wavemeter, a corresponding set of measurements from the plurality of photodetectors, the training optical signals having known and differing wavelengths; and
estimate optical parameters of the wavemeter based on the sets of measurements and an indication of the known and differing wavelengths,
wherein the optical parameters are indicative of at least:
a length difference ΔL between said two unequal-length waveguides; and
scattering parameters of the second MMI coupler,
wherein said estimating the optical parameters comprises, by the electronic device:
performing a search operation to determine one or more output values for at least one of the optical parameters, such that said one or more output values causes a predetermined condition in an objective function, the objective function indicative of a difference between the sets of measurements and an expected value for the sets of measurements, the expected value generated based on a numerical model which incorporates candidate values for said optical parameters.

13. The wavemeter of claim 12, wherein the second MMI coupler has two or more input ports and three or more output ports.

14. The wavemeter of claim 12, wherein an input port of the first MMI coupler or optical signal splitter, configured to receive the input optical signal, is coupled to an optical switch, the optical switch controllable to select one of a plurality of reference optical signals for frequency measurement thereof.

15. The wavemeter of claim 12, wherein the objective function is an error function, and the predetermined condition is achieving a minimal value.

16. The wavemeter of claim 12, wherein the numerical model is a linear algebraic model.

17. The wavemeter of claim 12, wherein the electronic device is further configured, following said estimating the optical parameters, to use the optical parameters to determine a wavelength or frequency of a subsequent optical signal input to the wavemeter, based on a further corresponding set of measurements from the plurality of photodetectors.

18. The wavemeter of claim 17, wherein:
the numerical model generates said expected value by multiplying a matrix A by a vector x, the matrix A indicative of estimated values for the scattering parameters, the vector x indicative of an estimated value for a phase shift between the two portions of the input optical signal propagating in the two unequal-length waveguides, where the input optical signal is one of the training signals, the phase shift being due to said length difference ΔL; and
wherein determining the wavelength or frequency comprises:
computing an inverse of the matrix A;
multiplying said inverse by a vector representing the further set of measurements to obtain a result vector; and
further processing of the result vector.

19. The wavemeter of claim 17, wherein the electronic device is further configured to:
obtain a first one or more temperature readings indicative of temperature of the optical delay line structure during said estimating of the optical parameters; and
obtain a second one or more temperature readings indicative of temperature of the optical delay line structure during inputting of said subsequent optical signal to the wavemeter,
wherein said determining the wavelength or frequency of the subsequent optical signal is further based on the first one or more temperature readings and the second one or more temperature readings.

20. The wavemeter of claim 12, wherein each set of measurements includes a measurement indicative of total optical signal power of a corresponding one of the set of training optical signals, and wherein said estimating the optical parameters is further based on the measurements indicative of total optical signal power.

21. The wavemeter of claim 12, wherein the plurality of photodetectors comprises at least three photodetectors coupled to at least three respective outputs of the second MMI coupler.

22. The wavemeter of claim 12, wherein:
(a) the optical parameters indicative of the length difference ΔL comprise one or more optical parameters indicative of a phase shift between two respective portions of an optical signal propagating in the two unequal-length waveguides; or
(b) the optical parameters are further indicative of one or more of:
scattering parameters of the first MMI coupler or optical signal splitter;
optical parameters of at least one of the plurality of photodetectors; and
electrical parameters of said at least one of the plurality of photodetectors; or
both (a) and (b).

* * * * *

UNITED STATES PATENT AND TRADEMARK OFFICE
CERTIFICATE OF CORRECTION

| | | |
|---|---|---|
| PATENT NO. | : 12,313,470 B2 | Page 1 of 1 |
| APPLICATION NO. | : 17/560901 | |
| DATED | : May 27, 2025 | |
| INVENTOR(S) | : Trevor James Hall et al. | |

It is certified that error appears in the above-identified patent and that said Letters Patent is hereby corrected as shown below:

In the Specification

Column 3, Line 12, "include a first MIMI coupler or optical signal splitter con-" should read -- include a first MMI coupler or optical signal splitter con- --;

Column 9, Line 12, "model can be generalized to larger second MIMI couplers" should read -- model can be generalized to larger second MMI couplers --;

Column 9, Line 27, "second MIMI coupler, where m indexes the output ports" should read -- second MMI coupler, where m indexes the output ports --;

Column 13, Line 42, "where co is a difference from a reference frequency" should read -- where $\omega$ is a difference from a reference frequency --;

Column 20, Line 9, "optical signal splitter, and a 3×3 MIMI coupler was used as" should read -- optical signal splitter, and a 3×3 MMI coupler was used as --.

In the Claims

Column 23, Line 15, "scattering parameters, om represents a complex phase" should read -- scattering parameters, $\varphi_m$ represents a complex phase --.

Signed and Sealed this
Ninth Day of September, 2025

Coke Morgan Stewart
*Acting Director of the United States Patent and Trademark Office*